United States Patent [19]
Apperson et al.

[11] Patent Number: 6,079,624
[45] Date of Patent: Jun. 27, 2000

[54] DATA PROCESSING FORM USING A SCANNING APPARATUS

[75] Inventors: William C. Apperson, 23311 194th Ave. SE., Renton, Wash. 98058; Courtland G. Beck, Kent, Wash.

[73] Assignee: William C. Apperson, Renton, Wash.

[21] Appl. No.: 08/987,108

[22] Filed: Dec. 8, 1997

[51] Int. Cl.[7] .................................................. G06K 19/06
[52] U.S. Cl. .......................... 235/494; 235/475; 235/482; 434/355; 434/403
[58] Field of Search ................................ 235/494, 454, 235/456, 475, 482, 460; 434/353, 355, 358, 403

[56] References Cited

U.S. PATENT DOCUMENTS

| | | | |
|---|---|---|---|
| 3,900,961 | 8/1975 | Skolski et al. | 434/463 |
| 4,228,952 | 10/1980 | Britton | 235/455 |
| 4,641,358 | 2/1987 | Archambeault et al. | 235/456 |
| 5,001,330 | 3/1991 | Koch | 235/436 |
| 5,085,587 | 2/1992 | Desforges et al. | 434/355 |
| 5,184,003 | 2/1993 | Mcmillin et al. | 235/454 |

*Primary Examiner*—Thien M. Le
*Assistant Examiner*—Daniel St. Cyr
*Attorney, Agent, or Firm*—G. Donald Weber, Jr.

[57] ABSTRACT

This invention is directed to an optical mark sensing device known as a mark read scanner for reading marks on a form. This scanner is a stand-alone device that has an internal micro-controller with the controlling software therein. An external personal computer is not required to operate the scanner in its intended manner. "Graphic switches" are printed on the form to define the characteristics of a form to be scanned. The expense of replacing the internal program of a scanner when a user requests a variation of a test form that had not been pre-programmed into the original specifications of the scanner is eliminated.

16 Claims, 16 Drawing Sheets

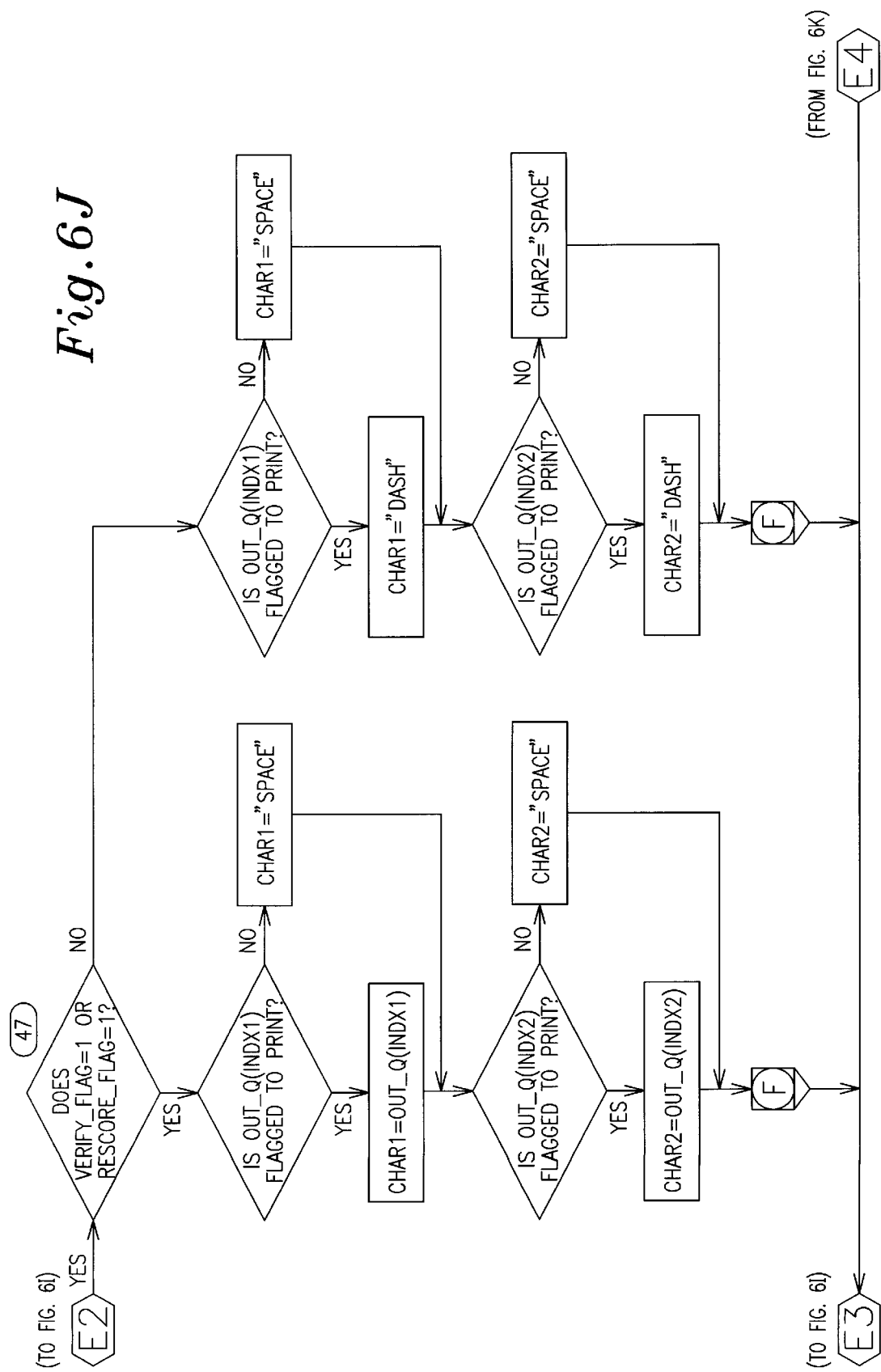

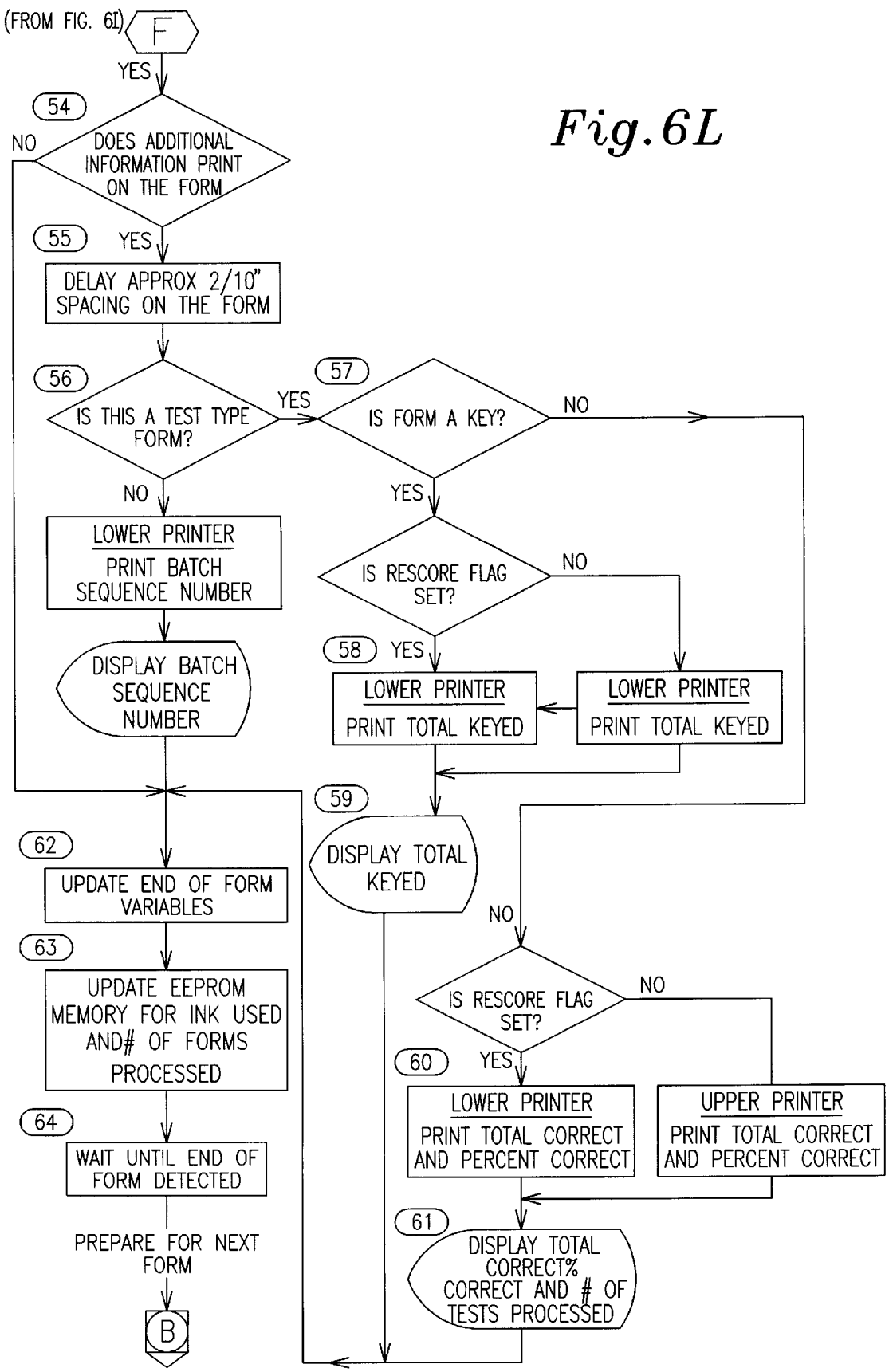

DATA PROCESSING FORM USING A SCANNING APPARATUS

BACKGROUND

1. Field of the Invention

This invention relates to an optical mark sensing device known, in general, as a mark read scanner and to a stand-alone device which has an internal micro-controller with internally stored driving software and graphic switches on forms associated therewith, in particular.

2. Prior Art

Mark read scanners are used in a variety of data collection applications. The forms used with mark read scanners are commonly referred to as "bubble" or optical mark read (OMR) forms on which the user fills in a bubble on the form, typically, with a number 2 lead pencil.

Present mark read test scoring devices and mark interpretation software use a binary system for describing the absence or presence of a mark. These systems are limited to the presence/absence or on/off binary sequence. Thus, very large numbers of codes are needed in order to read a relatively large number of marks. Mark positions are, typically, assigned digital values between "0" and "255" at the start of the process. These values are often refined to 16 levels and finally discriminated in a binary format where "1" represents a mark and "0" represents no mark.

Most known devices use markings, colloquially known as "skunk marks", on the leading edge of the form or scan document. Skunk marks are preprinted, form identifying, black marks which must match a mark pattern pre-programmed into the software of the scanner. If the skunk mark pattern for a new form has not been programmed into these devices, the scanner will reject the form as unrecognizable.

There are several stand-alone test scoring devices known in the art. Frequently, such devices are used within the education industry. These devices usually have been designed with limited versatility and do not easily handle additional test forms compatible with the mode of operation thereof. This lack of versatility is a significant inconvenience to the user who wishes to use a test form which is not included in the specific "family" of forms that has been "pre-programmed" or designed to operate with those devices.

One known scanner, in the form of a scoring device, does not use form identifying marks on the leading edge of the document. Rather, the form for this device employs black rectangular start and stop marks which are printed in line with timing marks on the document. The start mark is at the leading edge of the timing marks and the stop mark is at the trailing edge of the timing marks. These marks signal the scanner device to begin sensing for timing marks and stop sensing for timing marks, respectively. Other than the black rectangular start and stop marks, there are no other pre-printed marks on the document that convey document attributes to the scanner software for processing flow.

It was determined that there existed a need in the marketplace for a stand-alone test scoring device which did not limit the user to a limited grouping of test answer sheets that had been preprogrammed to operate within the device. Thus, the instant invention was developed to improve on the prior art system.

PRIOR ART STATEMENT

Reference is made to the following patents which are related to document/form scanning devices.

U.S. Pat. No. 3,800,439; TEST SCORING APPARATUS; Sokolski et al. This patent is directed to an apparatus and form which includes a "start of test mark" and an "end of page mark."

U.S. Pat. No. 3,900,961; TEST SCORING APPARATUS; Sokolski et al. This patent is a division of U.S. Pat. No. 3,800,439.

U.S. Pat. No. 5,001,330; OPTICALLY SCANNED DOCUMENT WITH FAIL-SAFE MARKING; Koch. This patent is directed to a form with a first control mark on one surface and a fail-safe mark on the reverse surface of the form.

U.S. Pat. No. 5,085,587; SCANNABLE FORM AND SYSTEM; DesForges et al. This patent is directed to a form and system which includes response control marks for controlling the input of numeric values and other mode selector media.

U.S. Pat. No. 5,184,003; SCANNABLE FORM HAVING A CONTROL MARK COLUMN WITH ENCODED DATA MARKS; McMillan et al. This patent is directed to a form with a timing track which includes pre-encoded data information.

Other prior art patents relating to scannable forms and scanning apparatus are extant. This listing is not intended to be considered exhaustive.

SUMMARY OF THE INVENTION

This invention is a stand-alone scanner device and a scannable form for use therewith. The scanner device includes an internal micro-controller. The driving software of the device is stored in internal memory in the micro-controller. A personal computer is not necessary to operate the scanner device. Graphic switches are printed on the leading edge of the form to define the characteristics of a test form by the switch settings printed on the form. Replacement of the internal program of a scanner for use with a test form that has not been pre-programmed into the original specifications of the scanner is eliminated.

The scanner device begins with a 0–255 read level range as in the prior art. However, the software in the invention allows for a binary or ternary interpretation of marks. The ternary interpretation discriminates 3 levels (blank, gray and black) and assigns values 0, 1, or 2, respectively.

Furthermore, this ternary based system is utilized in a unique way. For example, the scanner will not reject a form as unrecognizable merely because of the coded graphic switches, but will alter the software accordingly.

One significant purpose of this device is to grade student test forms in a classroom or school environment. Another purpose is to read ballot forms for elections or the like.

The specific use of graphic switches, as opposed to skunk marks, adds versatility to the test scoring device and allows the scanner to accept a multitude of test answer sheets without the costly expense of reprogramming the EPROM stored within the device. This device offers an economical solution to, inter alia, the education industry which seems to be constantly in a budgetary crisis.

BRIEF DESCRIPTION OF THE DRAWINGS

FIGS. 6A through 6L, inclusive, provide is a graphic representation of the operation of the system of the instant invention.

DESCRIPTION OF A PREFERRED EMBODIMENT

Figure 1:
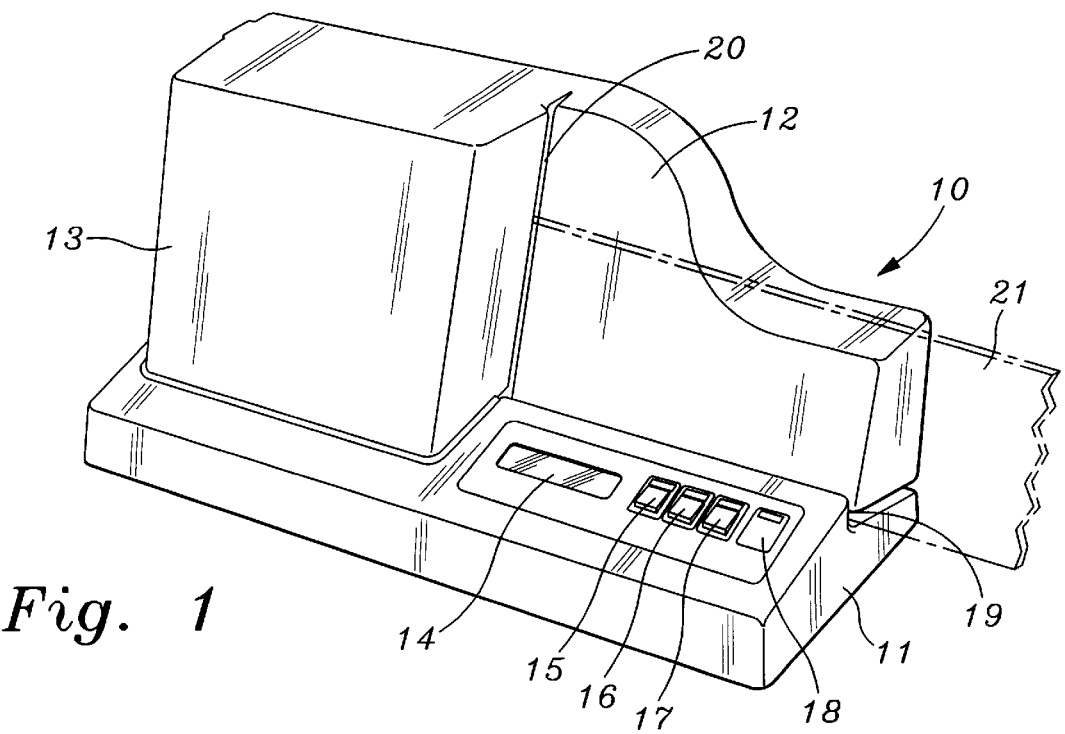
FIG. 1 is a front perspective view of the scanner of the instant invention.

Referring now to FIG. 1, there is shown a front, perspective view of the scanner 10 of the instant invention. The scanner 10 includes a base 11, a back support 12 and a housing 13. The back support 12 is used, inter alia, to support a form or document 21 (shown dashed) which is to be scanned by the system. The housing 13 is, typically, a removable housing which is used to cover the actual scanning apparatus as described hereinafter.

A channel 19 is formed between the base 11 and the back support 12 to receive an edge of the form 21.

A slot 20 is formed between the back support 12 and the housing 13 so that the form 21 can be passed therethrough adjacent to the scanning mechanism described hereinafter.

A display 14 of any suitable type, such as light emitting diodes (LED's) or the like, is used to provide information to the user, as described hereinafter.

In addition, the control buttons 15, 16 and 17 are used to cause the scanner to display totals (for example, count totals on a form; request the next display and key a reset function, respectively. A control switch 18 is provided to turn the machine ON or OFF, as desired. Typically, the scanner 10 is connected to a conventional power source. However, battery operation is contemplated.

When the switch 18 is placed in the ON position, the circuitry (not shown in FIG. 1) enclosed in housing 13 is activated. In a typical operation, the display 14 will indicate a status indication or the like. For example, a READY signal can be displayed. Thereafter, forms 21 are sent through the system by insertion into channel 19 and movement into slot 20.

In a preferred operation, when the form 21 is inserted into the system the circuitry is activated—typically by detecting the presence of a form—so that the form is then fed through the reading apparatus within housing 13. In the start up operation, a KEY form (or master form) is first passed through the scanner 10. The circuitry within the system is, thereby, set to a prescribed operating characteristic as defined by the coding on the KEY card 21.

At this time, the display 14 provides an appropriate designator such as ENTER or the like which indicates that the circuitry has been established for reading subsequent forms (e.g. test forms) similar to form 21 which are to be fed through the system for scanning and reading in accordance with the protocol established by the KEY card.

Thereafter, the test forms (or ballots or analysis forms) to be read (or scanned) are passed through the scanner 10 in the same fashion, whereupon the circuitry in the scanner interprets the coding on the test forms. The scanner 10 provides an output at display 14 which indicates any pre-established information, such as the number (and, thus, the identification); the information to be tabulated, (e.g. the number of right and/or wrong answers on the form); the percentage right and/or wrong answers (as desired); and the output of the ballot which has been scanned. Of course, any other appropriate sensing and reading can be established.

Although not visible in FIG. 1, an outlet port (see port 291 in FIG. 3) can be provided in the base 11, for example, at the rear of the unit 10. This port can be connected to an external operating system or the like, if desired. Thus, other more sophisticated operations can be controlled by the scanner 10.

Figure 2:
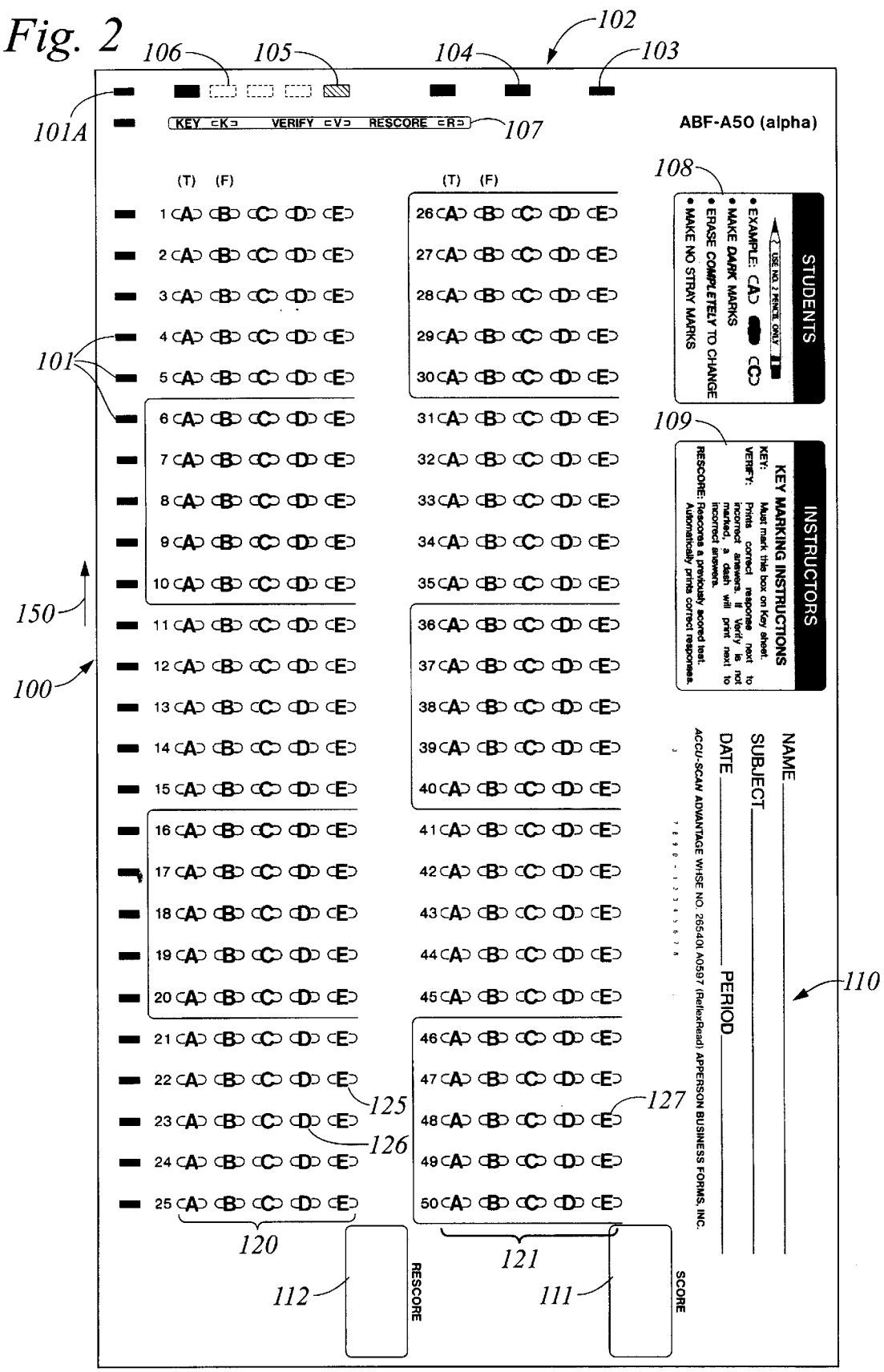
FIG. 2 is a representation of a scannable form according to the instant invention.

Referring now to FIG. 2, there is shown a representative scannable form 100 which is to be used with and scanned by the scanner device of the instant invention.

The basic configuration of the form 100 is similar to forms known and described in the prior art and, as well, generally known in the industry. The form 100, typically, is fabricated of paper or any suitable stock which is capable of receiving the information.

The form 100 can be in a vertical configuration (as shown in FIG. 2) or in a horizontal configuration, if so desired. However, the form is arranged to pass through the sensor 10 of FIG. 1 in the direction of the arrow 150 shown adjacent to the form 100.

The markings on the form include the timing marks 101 which are, in a preferred embodiment, placed along one edge of the form. Typically, this edge becomes the bottom of the form as it is passed through the scanner 10. The timing marks 101 are suitable and appropriate indicia which are read by the scanner and cause operation thereof.

In a typical case, the timing marks 101 are equally spaced from each other. The number of timing marks is determined by the type of form 100 which is being utilized and the controlling processes or software used in the system. Forms which are known in the art include 25 timing marks, 50 timing marks or any other suitable number.

It is also understood that the timing marks are associated with an equal number of rows of "bubbles" or marking areas of a conventional nature.

As shown in FIG. 2, the marking areas are, generally, rectangular blocks with encoded indicia such as alpha or numeric symbols associated therewith. These marking areas are arranged in horizontal rows and vertical columns, as is conventional. The rows are numbered 1 through n.

In addition, the form layout or format may include a plurality of testing columns 120 and 121. Each of the testing columns may include a plurality of marking columns, as shown, for example, by columns 125, 126 or 127. Moreover, it is contemplated that the rows of columns can be divided into "fields" for ease in using the forms. The fields, typically, are not significant to the operation of the scanner 10, per se.

The form 100 may also include other conventional information such as an instruction box 108 for the user and an instruction box 109 for the instructor or other individual who is controlling the use of the form. A typical block 110 can be arranged to include any other suitable information, such as address, subject matter, class period, date or the like.

A keyline 107 includes one or more response bubbles which are marked to designate a KEY form. For example, a test administrator can insert marks which flag the particular form as the instructor's KEY form which is used to set the "correct" responses for the scanner system.

A score box 111 and a re-score box 112 are provided on the form. These blocks are conventional in other scanning systems. Such boxes may be used or not as desired.

The form of the instant invention includes the header 102 which is, in essence, a first row on the form. The header includes a plurality of locations which are aligned with the individual marking columns on the form. In addition, these locations are aligned with the individual scanner elements in the scanner mechanism 10, as described infra.

In this invention, the header 102 includes a first timing mark 101A which is used to initiate the operation of the system. Another location in the header, typically at or near the other edge of the form is a skew detector block 103.

In this system, if the header block or timing mark 101A and skew detector block 103 are not detected by the scanning system within a specified time tolerance, it is assumed that the form 100 is improperly placed in the scanner, e.g. the form may be skewed whereupon the scanning interpretation of the information on the form 100 is rejected as erroneous. Typically, the form 100 is merely re-inserted into the scanner 10 in the appropriate alignment and the system operates properly.

In a preferred embodiment, the header 102 includes a plurality of locations which are, as noted, adjacent to the several scanner elements in the scanner device 10. The area blocks, in this invention, are arranged in a ternary system. Thus, the blocks can be white, gray or black. For example, as shown in FIG. 2, block 104 is shown as black; block 105 is shown as gray; and block 106 (represented by the dashed outlines) is shown as white (or blank).

In this embodiment, graphic switches 104–106 are rectangular marks which are represented in a ternary format on documents as 0% black (blank mark), 20% black (gray mark) and at least 90% black (black mark). These switches convey important specifications about the document which information determines how the software and hardware will perform when processing the document. The graphic switches are interpreted by the software in the scanner device as groups of 1, 2 or 3 switches. Of course, consideration of groups of 4 or more switches may be contemplated.

These groups represent specific attributes and/or characteristics of the document. For example, the graphic switch groups provide information about the forms, such as form type (tests, ballots, surveys, item analysis sheets or diagnostic forms); side of document (front or back); character printing (alpha, numeric or no printing); print offset (allows for varying vertical spacing of mark response rows); last row (information on the number of timing marks); and number of columns (1 or 2 column format). By representing these groupings with ternary based switches the number of combinations is increased. For example, using a group of three ternary switches allows for a combination of up to 27 types of forms. A binary interpretation would reduce this grouping to 9 types of forms.

Each of these areas or blocks in the header 102 is sensed by the scanner sensors when the form 100 is passed into or through the scanner 10. The scanner is operative to determine whether the header area is black, white or gray. With this arrangement, the header blocks (graphic switches) identify various operational functions for the system. Importantly, each of these switches has three separate and distinct characteristics, as noted.

Typically, but not limitative, the first three areas or graphic switches are used to identify the type of form. By having three graphic switches, each of which can assume one of three states, it is possible to identify 27 different types of forms. In the prior art, which utilizes only black and white, the permutations and combinations permit the identification of only 9 different forms.

The other graphic switches can be used to identify characteristics of the form such as the side of the form (front or back); the characters on the form (i.e. alpha, numeric or none); the print offset which designates any offset between the card and scanner assignments and/or ballot columns which indicate a specific type of form; the last row switch which represents the number of rows in the particular form (e.g. 10, 15, 20 and so forth); the number of columns (e.g., a pair of columns is shown in FIG. 2); the identification field and so forth.

Figure 3:
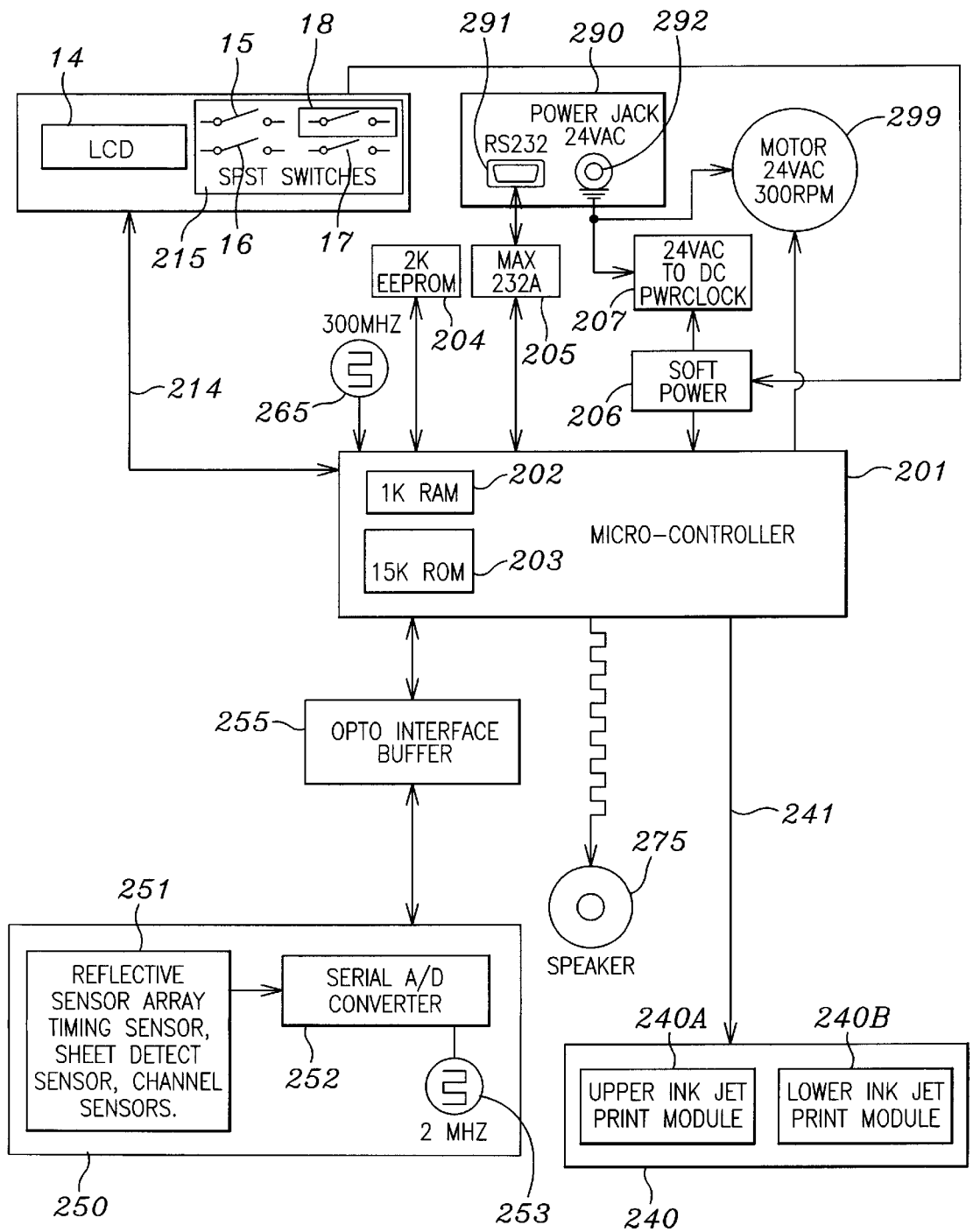
FIG. 3 is a schematic block diagram of the scanner of the instant invention.

Referring to FIG. 3, there is shown a schematic representation of the scanner 10. In particular, the scanner device 10 is powered on and off by depressing a SPST-type switch 18 (see FIG. 1) located on the display panel 215. The switch enables the machine to power on if the switch 18 is pressed and the machine is currently powered off. Alternatively, the machine will power off if the switch 18 is pressed and the machine is currently powered on. This is accomplished through soft power circuit 206 in which the power on/off switch 18 enables a voltage reducing circuit to reduce a 24 VDC rectified voltage to 5 volt Vcc.

The main controlling element is a micro-controller 201 which includes random access memory 202 and read only memory 203. When Vcc is supplied thereto, microprocessor 201 will boot and initiate the software flow as shown and described in detail infra in FIG. 4.

As described in detail later, booting up the microprocessor 201 initiates start-up routines such as stabilizing timers, enabling the LCD 14 and retrieving data stored in the eeprom 204. After these routines have been completed, the machine is in the READY state. In this state the scanner device is executing a tight loop in software which polls the display panel switches and the paper detect sensor.

The micro-controller 201 receives information from the input unit 250 which includes the sensor array 251 noted above. The sensor array includes, inter alia, the sheet detector sensor, the timing sensor and the channel sensors. The sensor array 251 provides analog output signals which are supplied to the serial analog-to-digital converter 252. The A/D converter 252 receives a suitable input clock signal from the clock circuit 253. In a preferred embodiment, this clock signal has a frequency of 2 MHz. The digitized output of the input unit 250 (form A/D converter 252) is supplied to the opto-interface buffer 255 where the signal information is stored and made ready for supplying to the memories in the micro-controller 201. The micro-controller 201 supplies a signal to operate the motor 299 to drive the drive mechanism (see FIG. 4) which feeds the cards or forms 21 through the scanner apparatus 10.

The micro-controller 201 is connected to the output port 291 which is, typically, of the RS232 type via the serial communication circuit 205. The port 291 is located on a suitable panel 290 which may, in fact, be the rear panel of the scanner 10 shown in FIG. 1. A power jack 292 is also mounted in the panel 290. The power jack 292 is connected to interface with the soft power unit 206 which interfaces with the micro-controller 201.

The control panel of the scanner 10 includes the display 14 and the several switches 215 (the individual switches shown in FIG. 1), including the ON/OFF power switch 18 which is also connected to the soft power unit 206

The micro-controller 201 is also connected to receive a clock signal from the clock 265. This signal, typically, has a frequency of 33 MHz.

The micro-controller is connected to drive the print mechanism 240 which, in this case, includes an upper ink jet module 240A and a lower ink jet module 240B. Of course, the printer may include any desirable number of modules, provided that the appropriate control mechanisms are provided in the micro-controller and the supervisory software.

A brief description of the operation of the system shown in FIG. 2 begins when the sensor array 251 detects the presence of a form 100, the timing marks 101 thereon and the respective signals in the various channels 125, 126 and 127. Software within the micro-controller 201 selects specific channels by sending signals to buffer 255 which decodes the signals into the format required by the A/D converter 252. The A/D converter performs an A/D conversion on the selected channel. Signals form the sensor array 251 are supplied to the A/D converter 252 where they are converted to the appropriate digital signals and then supplied to the micro-controller 201.

The micro-controller interprets the information from the A/D converter 252 in accordance with the software package in the micro-controller and as set by the user of the scanner 10 who has preset appropriate information in the controller 201 and the KEY card operation as discussed supra.

The display 14 displays the appropriate information as determined by the operation of the micro-controller 201 and the respective operations of the switches 215 (as described infra).

The signals in the micro-controller can also be supplied to the output port 291, if so desired.

It should be noted that, upon the detection of the presence of a sheet or form by the sensor array 251, the micro-controller 201 supplies a signal to the motor 299 which activates a drive mechanism which causes the form to be passed through the scanner to be read by the remainder of the sensor array and, thereby provide the other signals to the micro-controller 201.

After and/or during the passage of the form 21 through the scanner, the micro-controller 201 operates to supply the appropriate signals to the display 14 and to activate the appropriate printer modules in the printer mechanism 240 to apply markings to the form which has passed through the scanner.

When a sheet (form) 21 is detected, the A/D conversion value of sheet detect sensor 450 (see FIG. 4) has a value less than a prescribed number, e.g. 255. The voltage level detected from the sheet detect sensor is supplied to the serial ADC (analog-to-digital converter) 252. The micro-controller 201 directs the ADC to digitize the analog voltage level and send the digital value via serial transmission at 2 MHz back to the micro-controller 201. If the value of the digitally converted voltage from the page detector sensor is equal to 255, a sheet has not been detected. If the value is less then 255, the software determines that a sheet has been detected and turns on motor 299 which is connected directly to the 24 Vac power supply 292. Thus, a signal supplied to the motor 299 via the micro-controller 201 as a result of a sheet being detected activates the motor. The motor 299 will continue to run until a sheet is no longer detected by the page detect sensor. When a sheet is no longer detected, a delay of approximately 5 seconds will take place after which the micro-controller 201 will signal the motor 299 to turn off.

The machine retains critical data regarding sensor calibrated values, page counts and ink levels in memory 204 which, in a preferred embodiment, comprises a 2 Kbytes eeprom read/write memory connected to the micro-controller 201. When a sheet has been successfully processed, the page count value stored in the eeprom is incremented by the micro-controller 201. Also, upon completion of the processing of a sheet, the count of the ink drops sprayed by the ink cartridges in the printer 240 is added to the current value and stored in the eeprom. The ink level measurement is stored in the eeprom and is used to warn the user of low ink levels in either of the two ink cartridges used on the machine.

The LCD (liquid crystal display) 14 located on the display panel of the machine is a 5×8 dot matrix type with a 2 line display of 16 characters each. The LCD 14 is connected to the micro-controller 201 via interconnect cable 214 to transmit controlling signals (RS, R/W and enable).

The LCD 14 is a user interface which displays instructions, test results, class averages, ballot results, error messages, machine status, ink levels, form counts, serial number and such, as defined by the system operation as described infra. Message types displayed by the LCD are shown in the flow chart, FIG. 6, and described in further detail infra.

In one embodiment, the scanner 10 is able to sound an audible tone to alert the user of a message displayed on the LCD 14. The tone is generated by a piezo-type buzzer which is placed on the main micro-controller 201 board. The tone is generated by an oscillating signal from the micro-controller 201 to the buzzer or speaker 214. The duration and frequency of the tone is controlled by software. The tone is sounded upon machine start-up upon reaching the READY state. The tone is also sounded when a key form has been processed to alert the KEY operator to verify that the total keyed message displayed on the LCD 14 matches the anticipated total. Further, a series of two successive tones alerts the user to an error or warning which is described in visual format on the LCD 14.

In a preferred embodiment, the printer assembly comprises two ink jet carriage assemblies which are secured in housing adjacent to a fixed position that is defined by the paper channel path 19. The assemblies 240A and 240B are mounted such that the respective ink spray will be directed through a hole in the face plate and directly into the paper path. Therefore, signals can be sent to each ink cartridge to spray a controlled dot pattern representing a character, number dash or other symbol directly onto the paper.

The ink cartridge assemblies are positioned vertically in relation to one another such that assembly 240A is considered the upper assembly and assembly 240B is considered the lower assembly. The assemblies are positioned in a way that they will form characters on a test answer sheet (or item analysis form) in predefined areas that have been left blank on such document for this purpose. The cartridge assemblies are available to print in red ink, blue ink or black ink.

The ink carriage assemblies are connected to the micro-controller 201 board via flex cable 214. There are a series of 12 nozzles on the ink cartridges which can be individually indexed by software. A drop of ink is ejected from a nozzle toward the sheet of paper that is being transported through the paper path. The ink is ejected by energizing a thin film resistor corresponding to a particular nozzle with less than 40 micro Joules for a period of approximately 4–5 micro sec. Characters can be formed on the moving paper by controlling the firing sequence and timing of selected nozzles. This control is performed in software and particular characters are formed by following a predefined firing sequence stored in a font look up table which is stored in ROM memory in the micro-controller 201.

Figure 4:
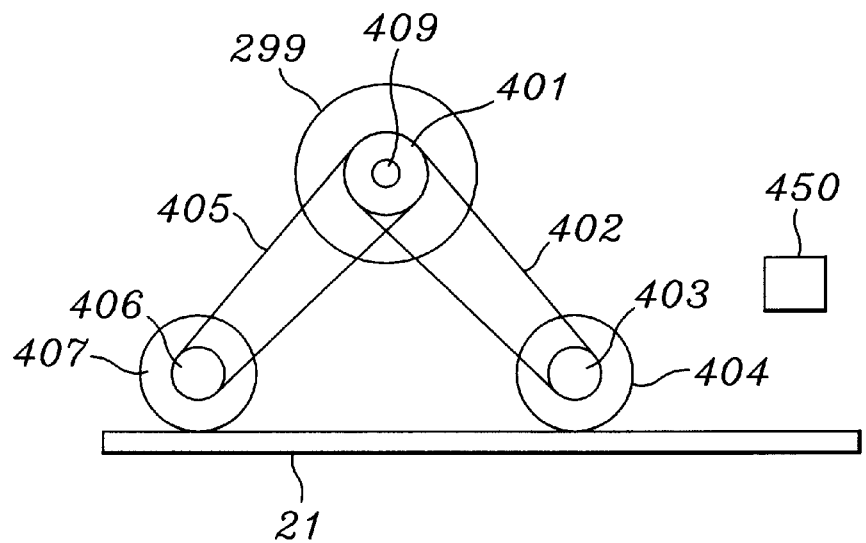
FIG. 4 is a schematic representation of the scanning and driving mechanism of the instant invention.

Referring now to FIG. 4, there is shown a rudimentary diagram of the sheet detecting and moving portion of the scanner 10. In particular, the motor 299 is located adjacent to the paper path channel 19. The motor 299 is positioned such that the shaft 409 thereof is directed downward toward the base of the machine. Belt pulley 401 is attached to the shaft 409. Belt 402 is directed toward the paper feed mechanism and looped onto timing belt pulley 403 which is attached to the shaft of the paper feed roller 404. The belt 405 is directed toward the paper exit mechanism and is looped onto timing belt pulley 406 attached to the shaft of the exit roller 407. This combination of motor, pulleys, timing belts and rollers comprises the paper transport mechanism which pulls the sheet through the paper path of the machine. Upon exiting the paper path, the paper falls into a paper tray (not shown) at the exit side of the machine.

Figure 5:
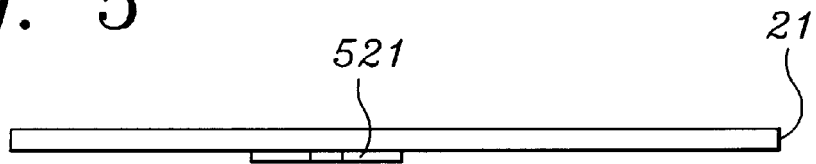
FIG. 5 is a schematic representation of a sensor utilized in this invention.
Figure 5:
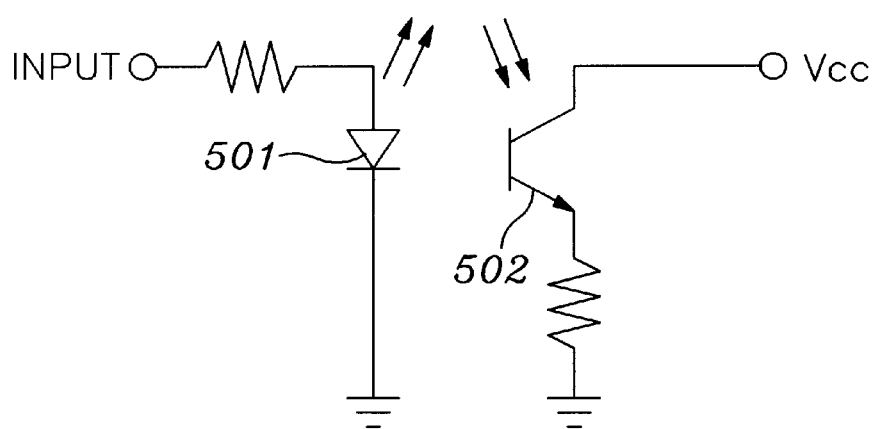
Figure 6A:
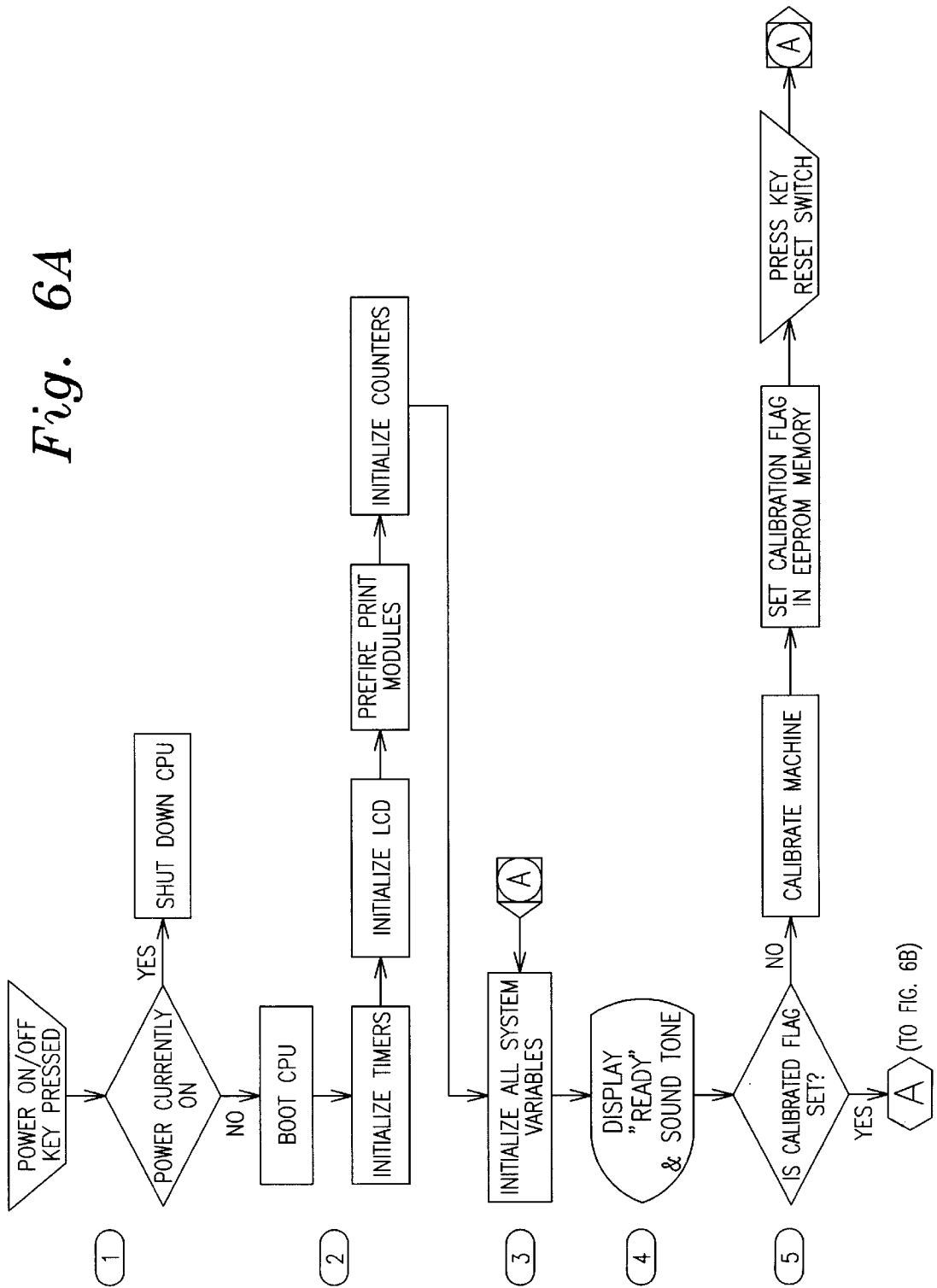
Figure 6B:
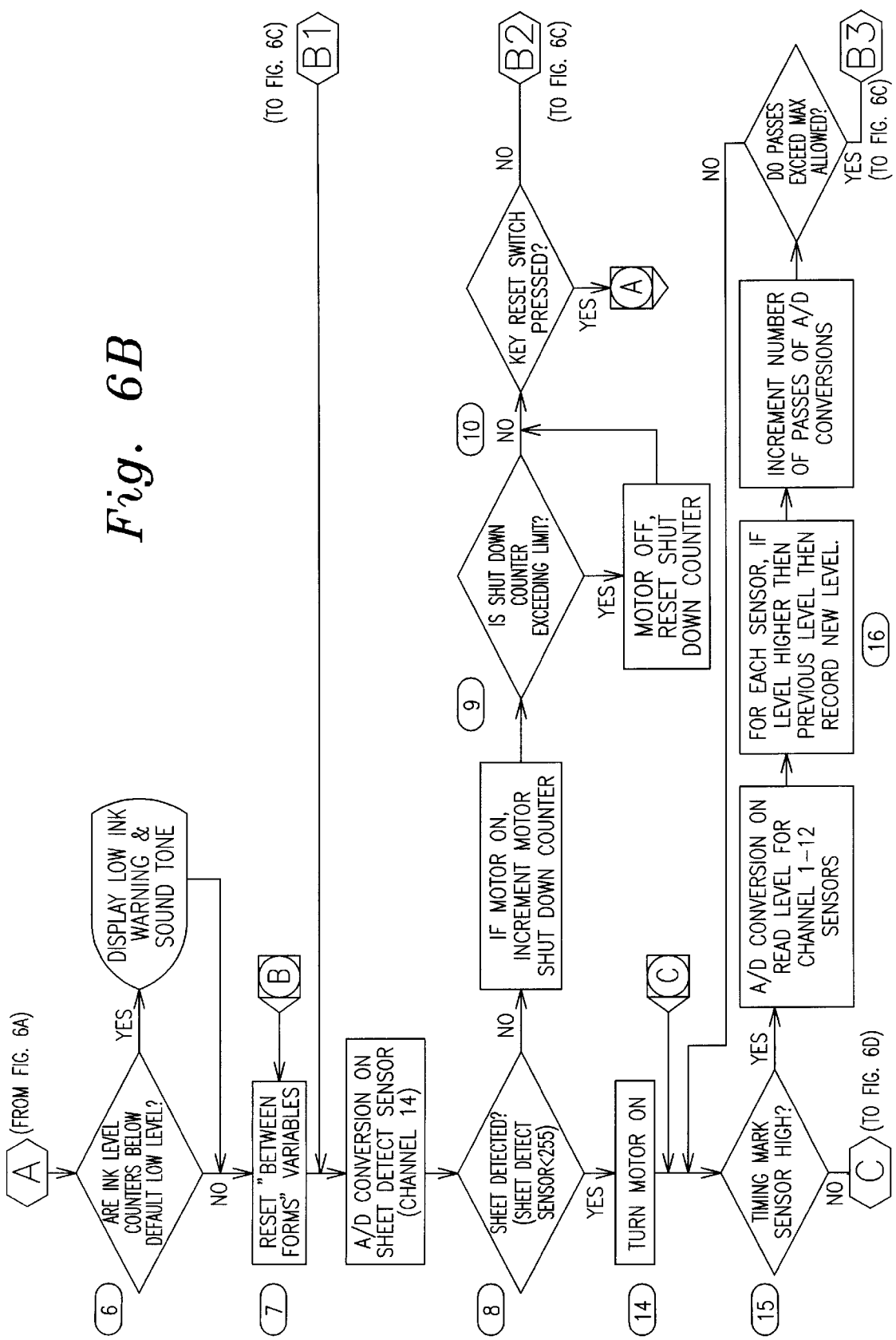
Figure 6C:
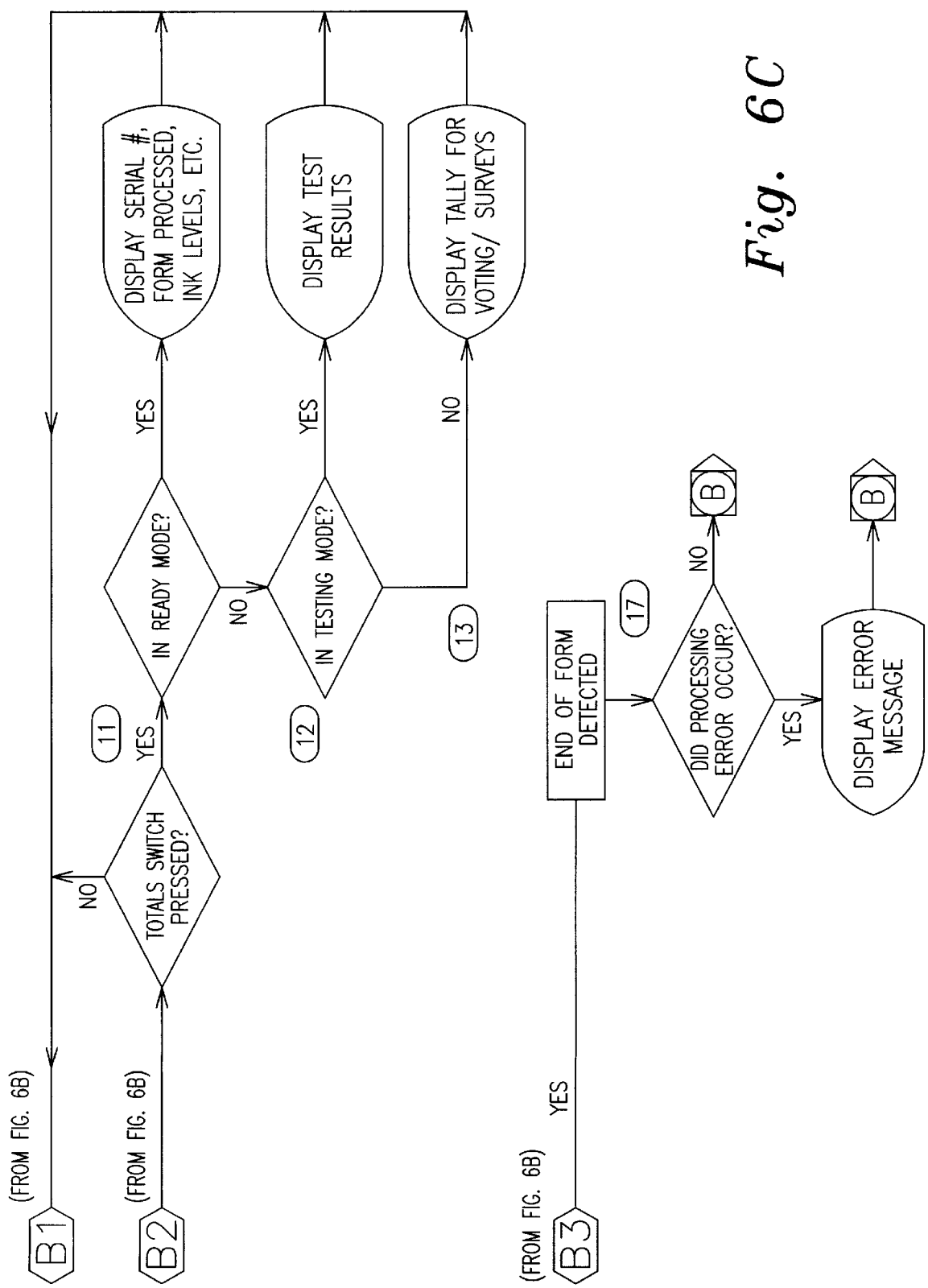
Figure 6D:
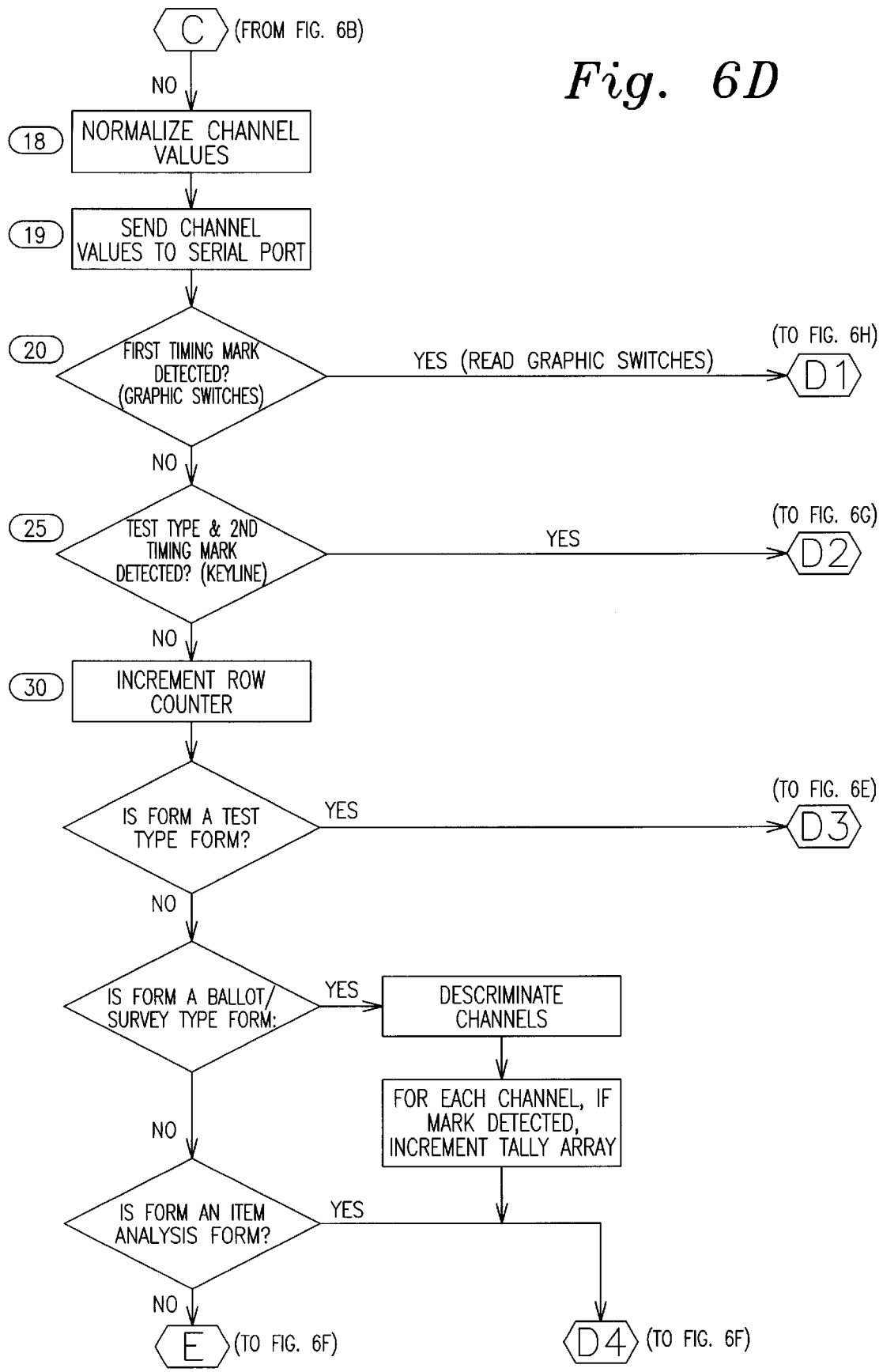
Figure 6E:
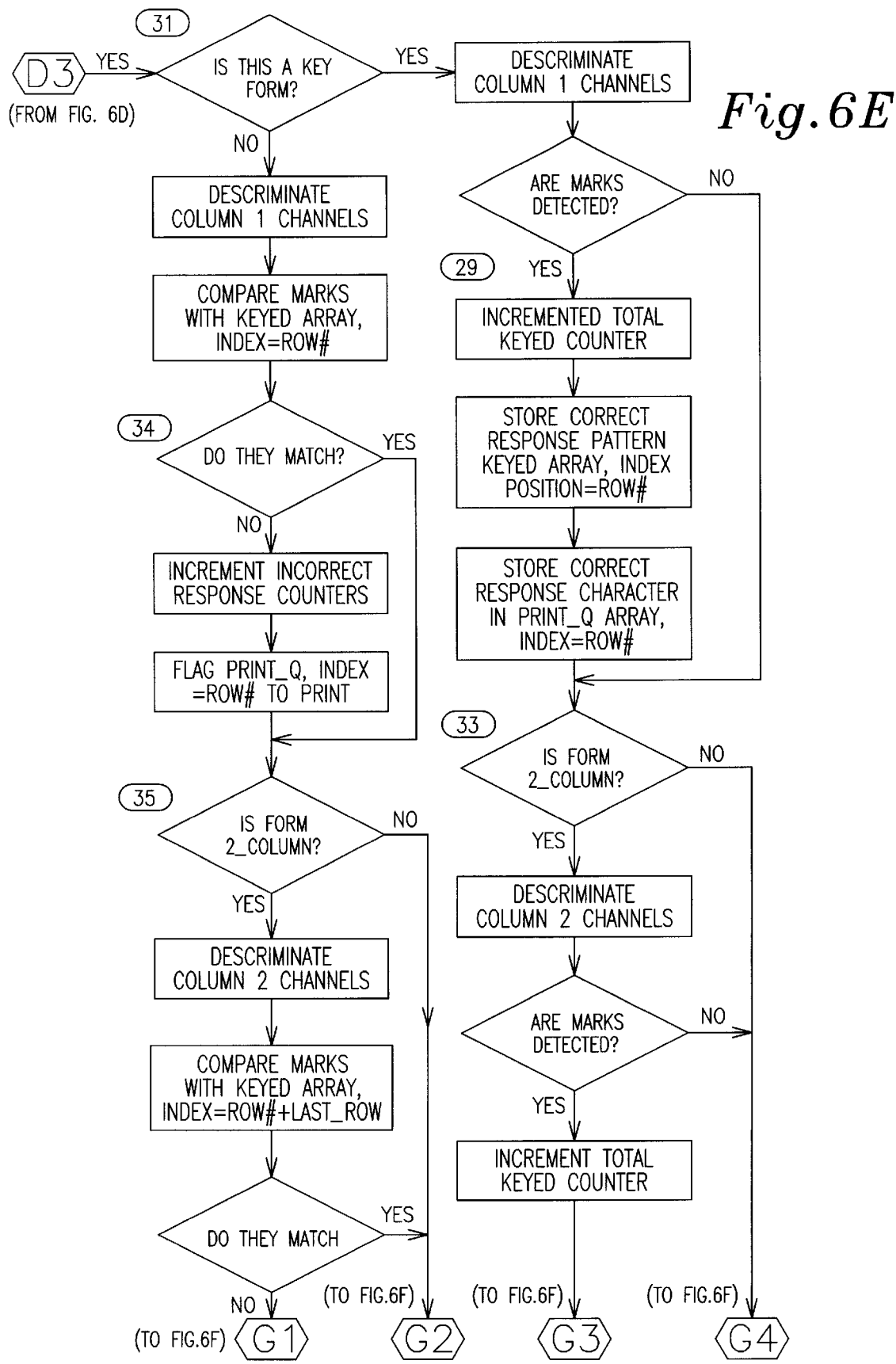
Figure 6F:
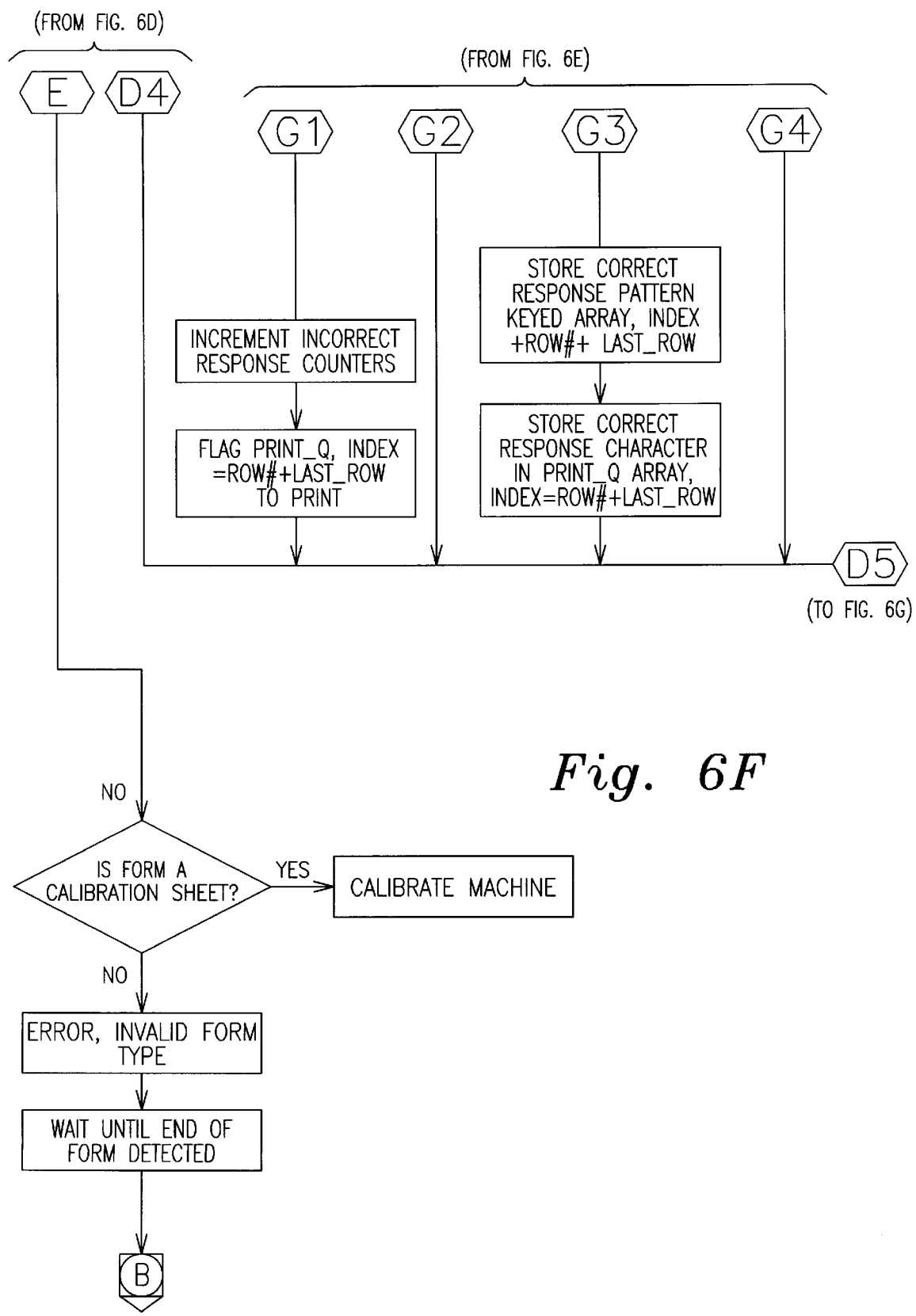
Figure 6G:
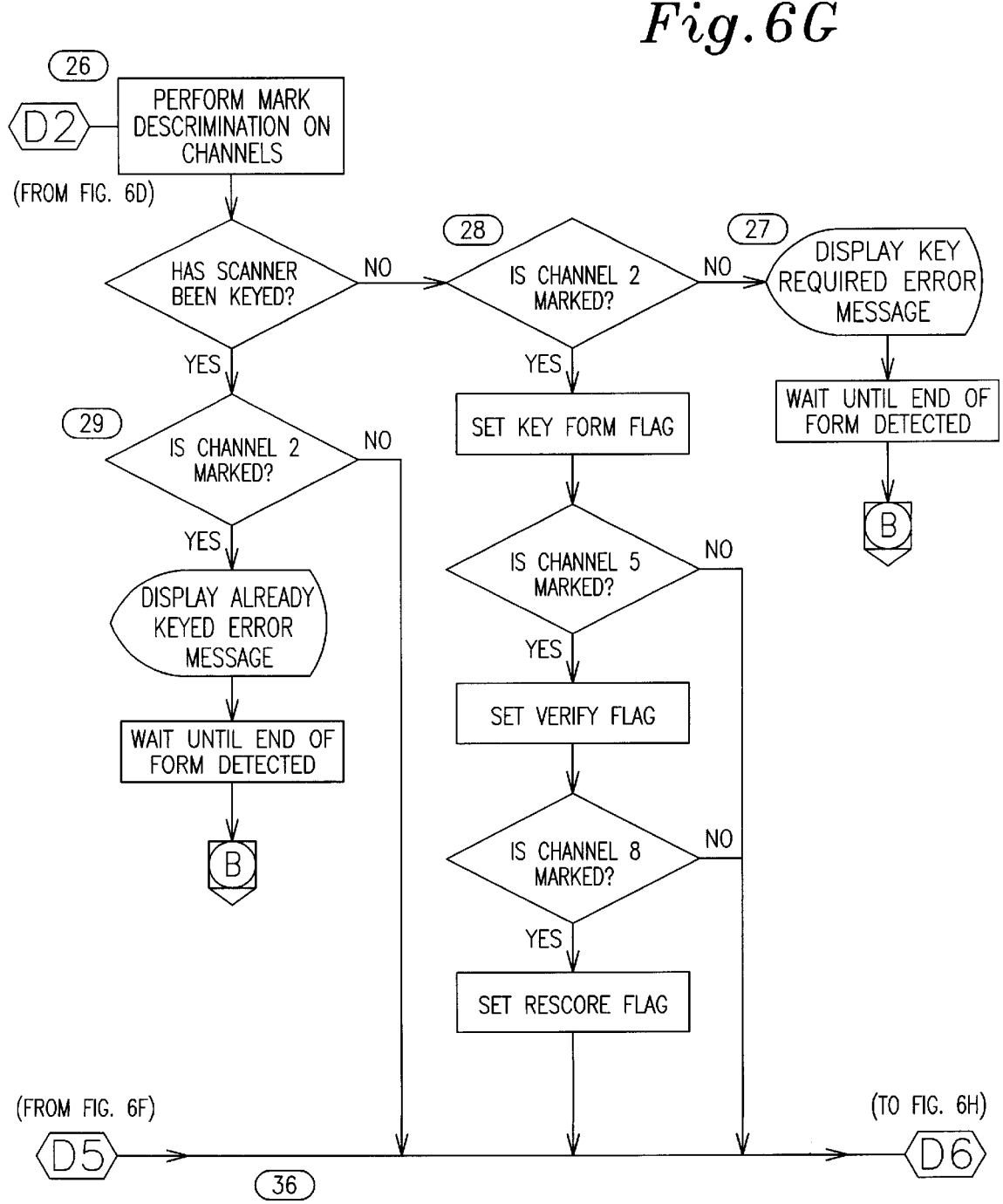
Figure 6H:
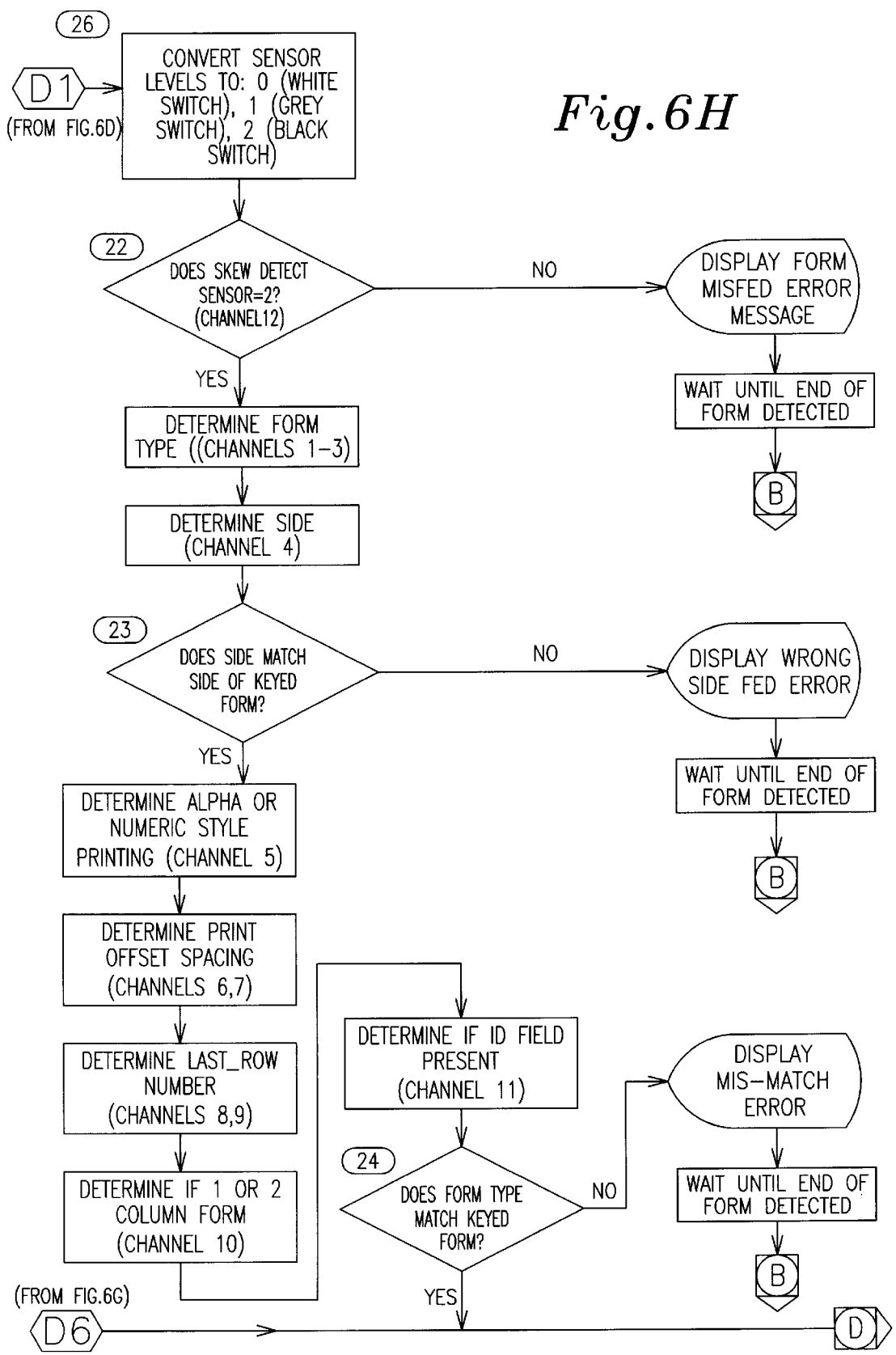
Figure 6I:
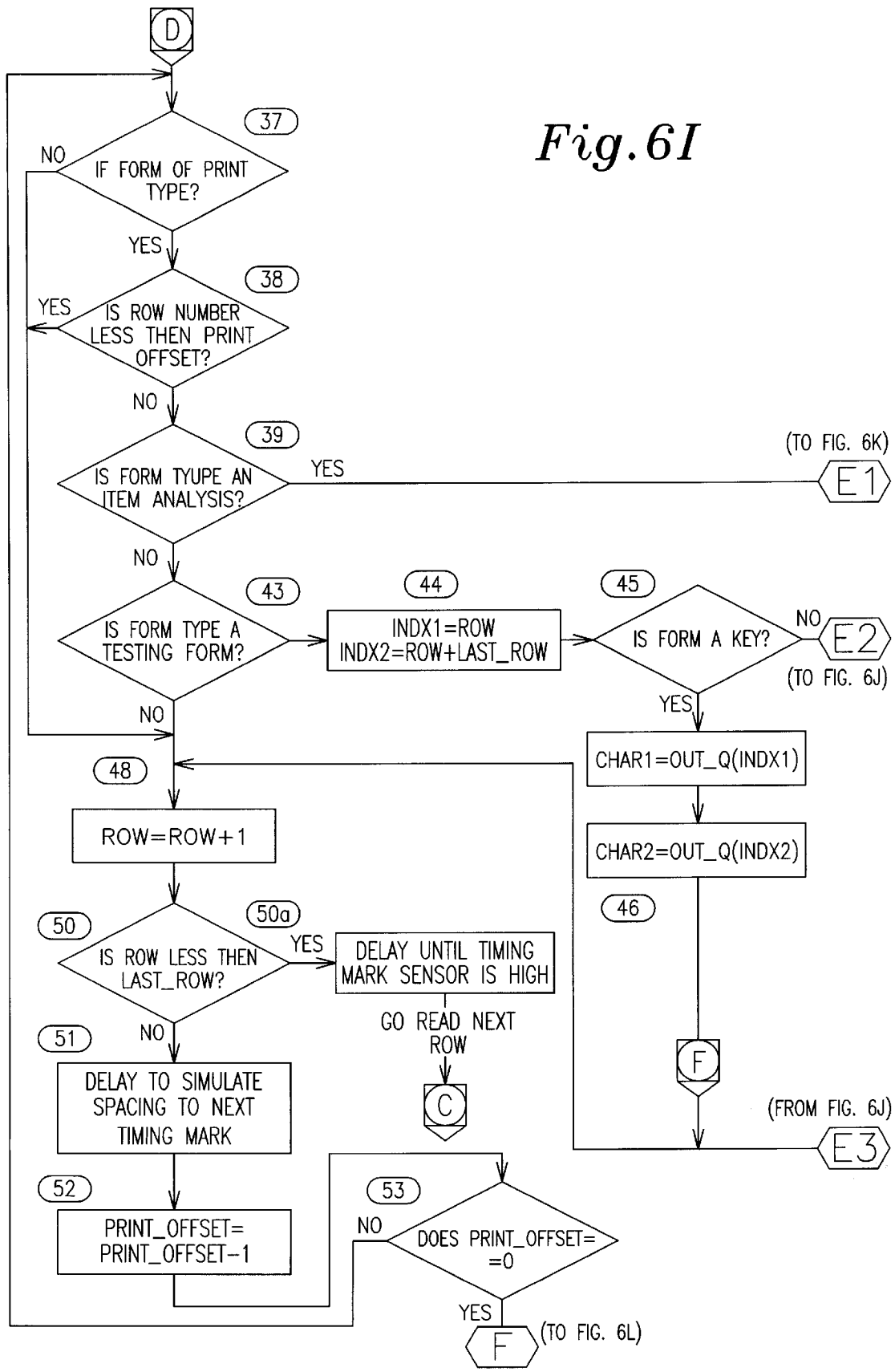
Figure 6K:
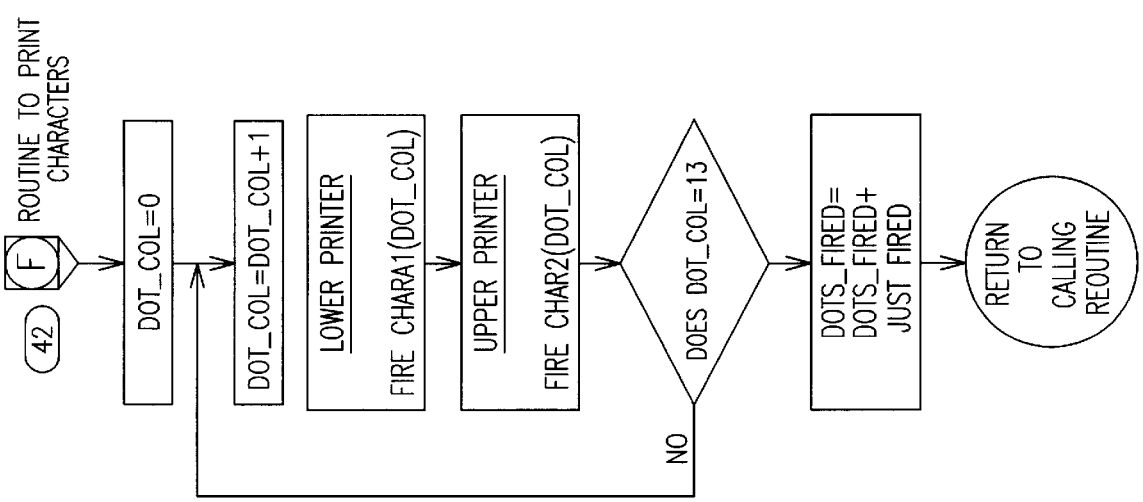
Figure 6K:
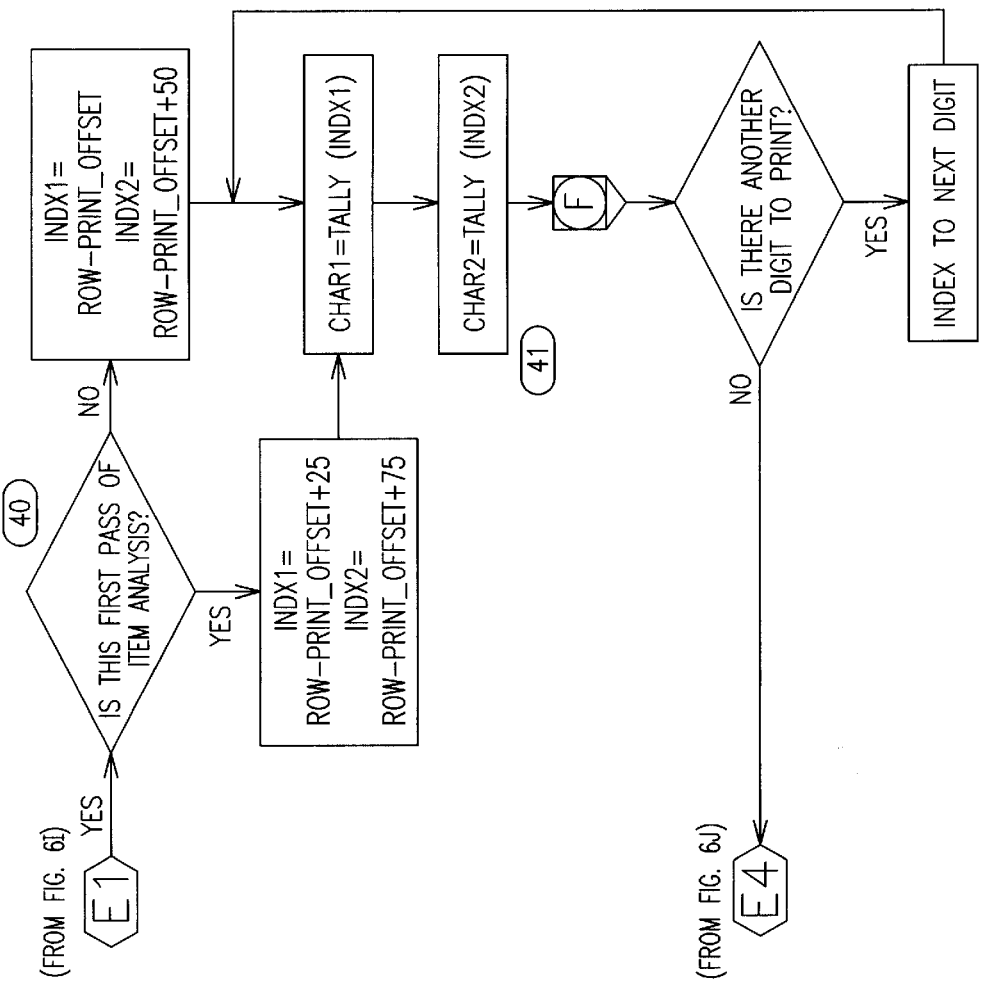

Referring now to FIG. 5, there is shown a sensor used in the scanner 10. The machine utilizes a grouping of 14 infrared reflective sensors (Omron part No. SY169A). One sensor is used as a page detect sensor. The other thirteen sensors are used to detect marks on the form. In particular, the page detect sensor detects a return signal (or not). However, the scanner utilizes the other thirteen (13) infrared light emitting diodes (LED) with reflective, convergent lenses to sense the absence or presence of pencil marks. The light emitted from each diode 501 is directed at a precise angle toward the OMR scan form 21 and reflected back to the sensor 502. The precise angle of light provides a mark sensing accuracy as high as ±0.6 mm.

The LED 501 emits infrared light with a peak emission wavelength of 920 nm. Wave lengths in the infrared range are absorbed by the carbon content in graphite lead pencils. The amount of light reflected back to the collector plate of the sensor 502 is inversely related to the intensity of the pencil mark 521 absorbing the reflected light, i.e. the darker the pencil mark, the lower the light intensity reflected to the sensor. The reflected light collected by the sensor 502 creates an output voltage which can be measured. The voltage level is determined by the amount of light reflected and, therefore, can be used to represent the intensity of pencil marks.

The first sensor in the array is used to sense timing marks 101 on the form 21. The remaining 12 sensors in the array are used to sense the absence or presence of pencil marks in the other columns (see FIG. 2). When a timing mark 101 is detected, the remaining 12 sensors in the array are switched on. While the timing mark is detected, the analog voltage level measure d from the collector plate of each of the other sensors is converted to a digital value between 0–255. This conversion is accomplished in the hardware by analog to digital converter 252. After the timing mark 101 has passed under the first sensor and is no longer detected, the digital values of the remaining sensors are analyzed in software (see FIG. 6). These values indicate the voltage level generated by the collector plates of the sensors 502 by the reflected light and, therefore, are be used by software to determine the intensity of pencil marks.

The initial phase of analyzing the outputs of sensors 502 begins with normalizing the digital values of each sensor so they can be compared to standardized mark threshold levels. Normalizing output values is necessary because each sensor operates under a unique voltage output curvature which can differ significantly in characteristic from other sensors in the array. Normalization is described infra.

Ideally, each sensor is defined in internal EPROM memory by an equation which represents its actual curvature characteristic when plotted on x, y graph. In this graph, the vertical-axis represents the sensors digital conversion value (0–255) of the analog voltage level resulting from reflection of emitted infrared light by the paper document. The horizontal-axis value is the normalized value, ranging from 0 to 31. This normalized value from the horizontal-axis represents the degree of intensity of a pencil mark on white paper. A value of 0 indicates blank paper with no mark detected. A value of 31 represents a very dark, well defined mark.

However, representing each sensor by an equation for a curve is not practical due to the complex calculations required to determine the curve and the time required to interpolate the curve for every mark position while a document is being processed.

Figure 7:
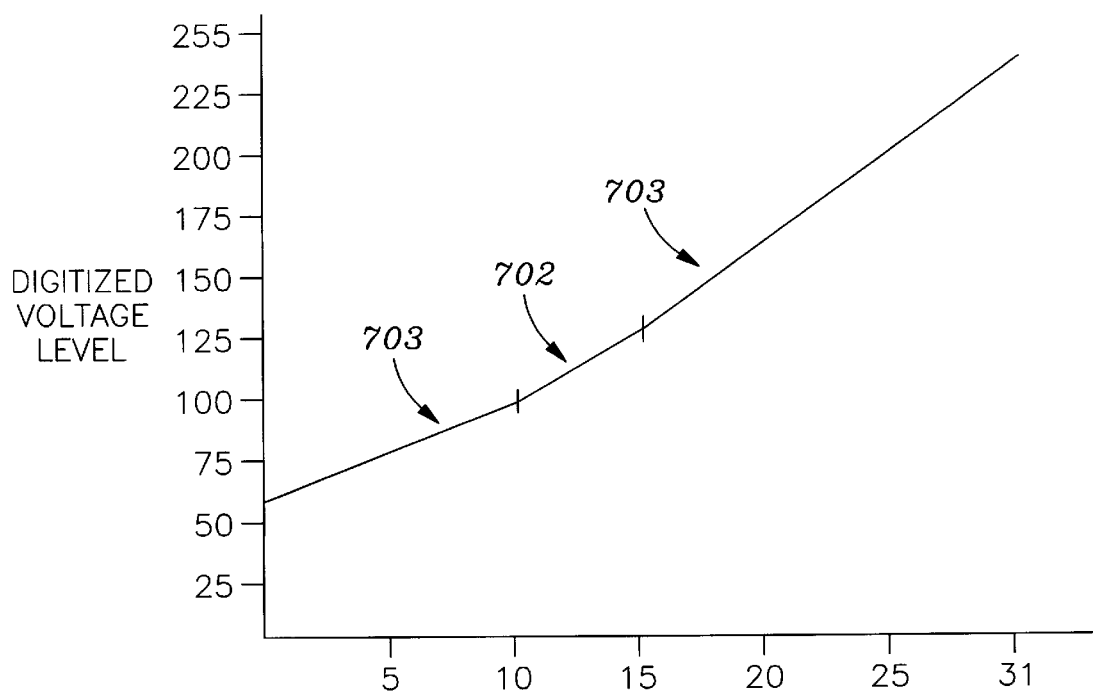
FIG. 7 is a graphic representation of a normalization process used in the system.

Referring now to FIG. 7, there is shown a satisfactory alternative is to simulate the natural curve of each sensor by defining three separate equations of a line over three (3) bands of the normalized voltage level represented by the horizontal-axis. The lines 701, 702 and 703 are calculated for low (0–9), mid (10–14) and high (15–31) ranges, respectively, over the normalized voltage level.

Mathematically, an equation of a line is determined by a slope and a y-intercept. An equation of a line is much simpler and quicker to deal with in software then the equation of a curve. The slope and y-intercept for each sensor over each of the 3 bands of the horizontal-axis are derived by passing a calibration sheet under the array of sensors. This operation calibrates the device and enables the software to calculate normalized values. Calibrating the device is done during the manufacturing process and can be easily be accomplished by the user at a later date. The calibration sheet is printed with a series of bars extended the length of the sensor array. These bars are screened in black ink using a 133 line per inch dot pattern. The bars are screened over varying dot densities. Sensor readings over the span of these screened bars are used to determine the required slope and y-intercept values for each sensor over the three (3) bands of the normalized voltage levels as related to the digitized voltage level represented by the vertical axis. These values are stored in non-volatile eeprom memory 204 and remain unchanged until another calibration sheet is processed and new values are determined.

The process of normalizing each sensor in the sensor array is necessary to accurately compare pencil marks intensity to a standard threshold level. The same process of normalizing sensor readings for pencil marks is also necessary to accurately determine the ternary state of each of the graphic switches pre-printed on the leading edge of the document. The carbon content contained in the black ink in which the graphic switches are printed will absorb infrared light in the same manner as the graphite content in pencil marks. As such, the normalized sensor array readings resulting from the reflected infrared light off of the graphic switch setting can accurately be used to determine the ternary state of the switches 0, 1 or 2 (0% black ink, 20% black ink, 90% black ink), thus enabling the scanner 10 to operate in conjunction with the same circuitry and components used to determine pencil mark intensity levels, as previously described.

Referring now to FIGS. 6A through 6L inclusive, there is shown a logical flow diagram of the operation of one embodiment of the scanner device of the instant invention.

When the user presses the power on/off switch 18 (FIG. 1) at step (1), the scanner 10 will be activated and the micro-controller 201 will execute an internal "boot" routine at step (2). Upon completion of boot-up, software will initiate a start-up routine to initialize timers, initialize the LCD, pre-fire ink modules to prepare them for printing and initialize counters. At this time, the software will execute a routine to extract pertinent data such as sensor calibration levels, mark threshold levels and mark discrimination level from the serial eeprom 204 (FIG. 3). This data is loaded into the micro-controller RAM memory 202 for quick access and calculations.

System variables such as arrays to store the print queue, arrays to store teacher keyed information, total values and control flags are set to the respective initial values at step (3). The scanner 10 is now set for its intended mode of operation.

At step (4), the word "READY" is displayed on the LCD 14 and an audible tone is sounded from the buzzer 275. This alerts the user that the scanner is now available to process/scan documents. The time between pressing the switch 18 and displaying the "READY" message is, typically, less then 1 second.

At time of manufacturing, a flag will be set requiring the assembler to calibrate the scanner upon initial power on. If the flag is set a "CALIBRATE NOW" message will be displayed on the LCD 14. Calibration at step (5) must be done at this time in order to proceed with further scanning operations of the scanner. The scanner can be re-calibrated by the user at any future time by passing a specially designed calibration sheet through scanner.

If the scanner is properly calibrated at step (5), the scanner will next execute an ink level check at step (6). The Hewlett Packard ink cartridges used by the scanner are each rated at 10 million droplets of ink. An ink drop count is stored in eeprom memory 204. If, during the ink level check, it is found that either cartridge has ejected more then 800,000 drops of ink, then a low ink warning is displayed on the LCD 14 and an audible tone is sounded at speaker 275.

Upon completion of the ink level check, variables and flags, such as correct score, votes marked and ink drops sprayed, that are used during the processing of individual sheets are reset to their initial values at step (7).

The software now enters into a loop at step (8) in which it will remain until either a sheet is detected, the DISPLAY TOTALS switch 15 is pressed or the KEY RESET switch 17 is pressed. A sheet is detected by continually polling the digitized voltage level of sheet detect sensor 450. A level equal to 255 indicates that a sheet is not detected. In the event that a sheet is not detected and the motor is still on from processing a previous sheet, a motor countdown will begin at step (9). This countdown, which is running concurrently with the polling of the sheet detect sensor, DISPLAY TOTALS 15 switch and KEY RESET switch 17, allows the motor 299 to run approximately 5 seconds prior to turning off if no further action is taken.

In the event KEY RESET switch 17 is pressed during the loop routine of step (8), system variables will be reset and the process will continue as shown in step (3). Pressing KEY RESET switch 17 is necessary prior to processing a new batch of test forms, surveys, ballots or other forms or sheets.

In the event DISPLAY TOTALS switch 15 is pressed during the loop of step (8), information which is pertinent to the current mode of the scanner 10 will be displayed on the LCD 14. If the current status is Ready Mode at step (11), the following information will be displayed; scanner serial number, software version number, mark threshold setting, mark discrimination setting, count of forms processed since new, count of forms processed since last calibration, count of forms processed since last maintenance, lower ink level and upper ink level.

If the current status at step (12) is The Testing Mode, the information which will be displayed on LCD 14 includes the count of test forms corrected in the current batch, the average raw score for the current batch and the average percent correct for the current batch.

If the current status at step (13) is The Ballot/Survey Mode, the information which will be displayed on LCD 14 includes the count of ballots/surveys processed in the current batch and the number of votes/selections for each possible option. In each of these modes, the "NEXT DISPLAY" switch 16 in FIG. 1 is pressed to scroll through all of the information presented and present this information on LCD 14.

To exit the loop at step (8) and continue with the processing of a scan document, sheet detect sensor 14 must have a digitized voltage level of less then 255. In this event, the motor 299 is turned on at step (14) and, if required, the user will continue to manually insert the scan document 21 until it is grabbed by the feed roller 403 in housing 13. (See FIG. 4)

The timing mark sensor 450 is now monitored by software. In the event a timing mark is detected at step (15) the software will execute a loop at step (16) which performs analog/digital conversions (e.g. in A/D converter 212) on the voltage levels of the pencil mark detect sensor array (sensors 1 through 12). If at step (16), the loop exceeds a specified number of iterations, the software determines that an end of form is detected. In this event, at step (17), if a processing error has been detected, an error message will be displayed. Processing will then return to step (7) in the software procedure.

In the event that a timing mark is detected at step (15) and the maximum iterations of the loop at step (16) has not been executed prior to the timing mark falling out of detection then the normalization of sensor readings will begin at step (18).

Now, continuing with the description of the logical flow as shown in FIGS. 6A through 6L, inclusive, after normalization at step (18), the values of the sensor read levels are transmitted to the scanner's serial port 291 at step (19) in parallel with sending these values to step (20). Sending data to the serial port 291 does not influence the stand alone processing functions of the scanner. Data sent to the serial port will be used only in the event the user has connected the scanner to an independent CPU via the serial port. In this event, the data will be transmitted to the independent CPU for further processing that does not materially affect the processing of the scanner.

If, through flag settings, it is determined at step (20) that a timing mark just processed was the first timing mark on the document, then the settings of the graphic switches will be analyzed at steps (21–24). (A description of the graphic switches is presented supra.)

If, as a result of flag settings, it is determined at step (20) that a timing mark just processed is not the first timing mark, processing of the document continues at step (25). If the document is a test type, as determined by graphic switch settings, and the timing mark processed corresponds to a keyline (e.g. keyline 107 in FIG. 2), then processing branches to step (26). If the scanner has not been keyed with responses and the key response bubble 107 has not been marked, then a key required error message is displayed on LCD 14 at step (27). In this event, processing will be interrupted until the end of the form is detected. Then processing will resume at step (7) of the program flow. If the scanner has not been keyed and the key response bubble has been marked, then the key flags will be set in step (28). This master form contains the correct response bubbles and sets the scanner for the batch of test answer sheets that will subsequently be processed.

If the scanner has previously been keyed and a document with the key response bubble marked is encountered at step (29), an error message indicating that the scanner is already keyed will be displayed. In this event, processing will be interrupted until end of form is detected and then processing will resume at step (7) of the program flow. This routine prevents a general test answer sheet from inadvertently re-keying the scanner as a result of the inappropriate marking of the key response bubble.

A negative response at step (25) leads to the row number counter being incremented at step (30). This counter (which resides, as a variable, in the Ram memory 202 within the micro-controller 201) refers to the actual row number corresponding to a question response row on a test answer sheet, ballot/survey or other scan document compatible with the scanner's operation.

If the form is not determined to be a test-type form, the system determines if it is a ballot/survey form, an item analysis form or a calibration sheet and proceeds as shown.

If the document is determined to be a test type form at step (30a) as previously determined by graphic switch settings and the key flag is set, the document is considered a key form at step (31).

If the document is a key form, the column 1 bubble positions will be discriminated to determine if pencil marks have been made. The process of mark discrimination, used throughout the scanning operation involves analysis of the normalized read levels of a grouping of sensors to determine if marks are present. If the normalized read level of a sensor is above a predefined mark threshold level stored in eeprom memory, then the bubble position corresponding to the sensor is flagged as a potential mark. After potential marks have been determined within a grouping of bubble positions, the read levels which represent pencil mark intensities are compared to each other. Any mark that falls within a predetermined mark discrimination range from the level of the highest normalized value detected will be considered a mark. The purpose of mark discrimination is to use intelligent logic to distinguish light pencil marks from poor erasures of unintended marks.

Continuing with the flow of operations, if a mark is detected at step (32), the total keyed counter within the Ram memory is incremented, the correct response pattern for the row is stored in the keyed response array and the font pattern of the corresponding correct response character is stored in the print queue array in the Ram memory in the micro-controller. If the test form is identified as a two column form at step (33), as determined previously by graphic switch settings, the process of discrimination, incrementing keyed counter and storage of keyed data will repeat for response positions in column 2.

After the key has been analyzed for marks within column 1 and/or column 2 of the document the logical flow proceeds to step (36).

Referring back to step (31), it is seen that, if the key flag is not set, grading of the row number of the current document will take place. Mark discrimination on column 1 grouping of sensors will determine which, if any, marks have been made within that grouping. The mark pattern of the test answer sheet is compared to the corresponding mark pattern of the keyed array for the row being analyzed. If the patterns do not match, the test question is determined to be answered incorrectly. In this event, the incorrect response counter is incremented and the corresponding character previously loaded in the print queue array is flagged to print. This process is repeated at step (35) if the form is a two column format. Once the mark analysis of a row for a key (or student test answer sheet) of a document has been completed, processing proceeds to step (36).

At this stage of processing, the bubble positions corresponding to the most recent timing mark detected have been scanned by the sensor array. The voltage levels of individual sensors have been digitized. These values have then been normalized and discriminated within select bubble groupings. The process of analysis of marks made within the groupings has been described. Prior to repeating this process for the next timing mark on the document, logical flow branches to the printing routine at step (37).

If the form is determined to be a test type at step (37), then the characters which are stored in the print queue are printed onto the form. When timing mark Y has been evaluated, the scanner cannot immediately print the appropriate print queue character associated with the timing mark with row Y because the print cartridges are located some distance away from the sensor array. Timing mark Y must travel this distance to be in position under the print cartridges to accept the corresponding print character. At this point, the sensor array is processing timing mark X. The difference between X and Y, represented by X-Y, is the print offset characteristic for the document. The print offset for a document is determined by the graphic switch setting adjacent to the first timing mark of the document. Print offset is a variable that indicates the vertical spacing between timing marks.

At step (38) of the logical flow, if the row number corresponding to the timing mark just processed is less then the print offset value, then there is no timing mark positioned under the print cartridge, the print routine will be bypassed and processing will continue at step (48). Alternatively, if the row number corresponding to the timing mark just processed at step (38) is greater then the print offset, the document is positioned properly in relation to the print cartridges for printing to be executed.

If the form type is determined to be an item analysis form at step (39), the contents of the tally array will be printed on the document. Indexes into the array, based on the position of the most recent timing mark processed, are calculated at step (40). Using these indexes, data to be printed is extracted from the tally array and passed to the print routine at step (42). The print routine uses a print algorithm that fires drops of ink alternately from the lower and upper ink cartridges in order to form the characters that were passed to the routine. The specific firing sequence for a specified character is stored in a font look up table stored within ROM memory 203 of the micro-controller.

Conversely, if the form type is determined to be a test form at step (43), the indexes into the print queue, which are based on the row number of the timing mark, are calculated at step (44). If the test form is determined to be a key at step (45), then the indexes are used to access the characters in the print queue. These characters are passed to the print routine at step (46) and processing resumes at step (42).

If the test form is not determined to be a key or master form at step (45), then it is a student test sheet. Flag settings are checked at step (47) to determine if characters from the print queue are to be printed or if dashes will be printed to represent incorrect responses on the test answer sheet. If a question has been incorrectly answered, the corresponding character in the print queue will have been previously flagged. If a character in the print queue is flagged at step (47a), the form is passed to the print routine at step (42).

After the print routine has been completed for a specific row of a document, processing continues at step (48). The row number is incremented at step (49) in preparation for repeating the cycle to scan, analyze and print based on the results of the next timing mark. If it is determined at step (50) that the row number is less then the last row value which was determined earlier from the graphic switch settings, the timing mark sensor is polled at step (50a) until the next timing mark is detected. When the next timing mark is detected, the processing is continued at step (14).

If the row is equal to the last (final) row on the form, a delay period is taken at step 51 in order to simulate the distance between timing marks. At this stage, the final timing mark sensor has been detected but earlier timing marks still required printing of characters from the print cartridges because of the spacing difference between the sensor array and the print cartridges. The print offset value, which represents the number of rows remaining to print is decremented. If this value is greater then 0 at step (53), then the systems returns to step (37) for further processing of the print routines.

When the printing of the print queue is completed, as indicated by a positive result at step (53), i.e. the print offset equals 0, the routine moves to step (54). If additional information, such as total key or total correct, needs to be printed on the document at step (54), then step (55) introduces a delay form until the form advances a prescribed distance related to the timing mark spacing.

If the form is determined to be a test type form at step (56), continue on to step (57). If the form is determined to be a key form at step (57), then print as directed at step (58) and display on the LCD at step(59) the total keyed value. If the form is not a key form, then print at step (60) and display on the LCD at step (61) the test score and percentage correct.

The document has now been processed by the scanner. The document continues through the paper path and is deposited at the output side thereof. End of form variables are updated at step (62) and the eeprom 204 is updated with current ink levels and forms processed counts at step (63). Delay until the end of form is detected at step (64) and return to step (7) of the program logic in preparation for processing the next document of form to be scanned.

Thus, there is shown and described a unique design and concept of a mark read scanner and form utilized therewith. The particular configuration of the scanner shown and described herein relates to a stand-alone device with an internal micro-controller 201 while the form uses groupings of ternary graphic switches thereon. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

We claim:

1. A data processing form for use with photo-sensing apparatus that senses the presence of indicia in indicia-receiving locations on the form, said form comprising:
    a sheet of material,
    a control mark column containing a plurality of first control marks disposed parallel to one edge of said sheet,
    a plurality of indicia-receiving locations for specified relation to said plurality of first control marks on said sheet;
    a control mark row on said sheet containing a plurality of second control marks,
    said control mark row aligned with at least one of said first control marks in said control mark column and perpendicular to the one edge of said sheet,
    each of said second control marks selectively exhibit at least three separate and distinct characteristics whereby said form is identified by said photo-sensing apparatus to determine a type of form being scanned and an operation to be performed by said apparatus.

2. A data processing form as recited in claim 1 including,
    a second control mark column containing a plurality of first control marks on a second surface of said sheet, and
    a plurality of indicia-receiving locations in specified relation to said first control marks of said second control mark column on a second surface of said sheet.

3. A data processing form as recited in claim 1 including,
    a skew control mark on said sheet aligned with and spaced apart from one of said control marks in order to detect the orientation of said sheet.

4. The form recited in claim 1 wherein,
    said control mark row is aligned with the first one of said first control marks in said control mark column.

5. The form recited in claim 1 wherein,
    said three separate and distinct characteristics are defined as black, white and gray.

6. Apparatus for scoring a test sheet of a type having plural indicia receiving spaces associated with answer options to a multiple choice question, mode indicating indicia each having at least three distinct detectable gray scale characteristics for identifying the type of test sheet provided and a type of operation to be performed by said apparatus, and answer control marks row aligned with said receiving spaces and said mode indicating indicia, comprising:
    detector means for concurrently sensing an answer control mark and any answer space row or mode indicating indicia aligned therewith and for entering binary data corresponding to said receiving spaces and ternary data corresponding to said indicating indicia into a shift register,
    said detector means operative to sense indicia in said answer spaces having at least two separate gray scale characteristics and in said mode indicating indicia having at least three separate gray scale characteristics,
    drive means for transporting said test sheet past said detector means, and
    answer comparator means for serially comparing said binary data and said stored answer data for each question and for providing an increment score signal indicative of a correct answer to that question when said binary data and answer data match based upon the gray scale characteristics of said mode indicating indicia.

7. Test scoring apparatus according to claim 6 wherein,
    said increment score signal advances a scoring counter for said test sheet.

8. Test scoring apparatus according to claim 6 including,
    means for computing the average score for said number of corrected test sheets by dividing the contents of said score accummulator by the contents of said number of test counters.

9. Test scoring apparatus according to claim 6 wherein,
    said increment score signal advances a score counter having an associated printer.

10. Test scoring apparatus according to claim 6 including,
    an error marker responsive to a mismatch between said binary data and said answer data for printing on said test sheet a mark adjacent an incorrect answer.

11. Test scoring apparatus according to claim 6 including, restore means cooperating with said error marker and said printer for offsetting the mark printed by said error marker and the score printout when a test sheet is rescored.

12. A test sheet according to claim 6 wherein, each answer row contains a plurality of answer receiving spaces designated to correspond to selectable answers of a multiple choice question.

13. A test sheet according to claim 6 wherein, at least one of said mode indicating indicia designates that the sheet is a master containing correct answers to be entered into said scoring apparatus, and at least one of said indicia designates the answer format of said sheet.

14. A scannable form for use in an optical mark reading system with optical sensing means of a type wherein sensing a presence or absence of response marks placed by a respondent in predetermined response areas on the form is triggered by sensing of a sequence of scan control marks associated with the predetermined response areas, comprising:

a generally rectangular sheet of material;

at least one column comprising a plurality of spaced apart scan control marks located on said sheet and oriented substantially parallel with an edge of said rectangular sheet;

at least one response area comprising a plurality of response bubbles on said sheet associated with one of said scan control marks; and a plurality of graphic switches located on said sheet, said graphic switches arranged to be aligned with one of said scan control marks in said column, said graphic switches comprise optically scannable areas on said sheet of material that represent encoded data information that is determined prior to a respondent using said scannable form whereby said graphic switches will be scanned and decoded by the optical mark reading system to identify the type of scannable form being used and an operation of the optical mark reading system during the scanning of said sheet of material, each of said graphic switches is comprised of a ternary coded mark having three distinct characteristics.

15. The form recited in claim 14 wherein, said sheet of material is made of paper.

16. The form recited in claim 14 wherein, said three distinct characteristics are defined as black, white and gray.

* * * * *